(12) United States Patent
Liu et al.

(10) Patent No.: US 10,790,894 B2
(45) Date of Patent: Sep. 29, 2020

(54) ELECTRONIC DEVICE, COMMUNICATION APPARATUS AND SIGNAL PROCESSING METHOD

(71) Applicant: Sony Corporation, Tokyo (JP)

(72) Inventors: Wendong Liu, Beijing (CN); Zhaocheng Wang, Beijing (CN); Jianfei Cao, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/463,384

(22) PCT Filed: Feb. 7, 2018

(86) PCT No.: PCT/CN2018/075545
§ 371 (c)(1),
(2) Date: May 23, 2019

(87) PCT Pub. No.: WO2018/153257
PCT Pub. Date: Aug. 30, 2018

(65) Prior Publication Data
US 2020/0136704 A1   Apr. 30, 2020

(30) Foreign Application Priority Data

Feb. 23, 2017   (CN) .......................... 2017 1 0100016

(51) Int. Cl.
*H04M 1/00*   (2006.01)
*H04B 7/06*   (2006.01)
*H04B 7/0456*   (2017.01)

(52) U.S. Cl.
CPC ......... *H04B 7/0639* (2013.01); *H04B 7/0469* (2013.01); *H04B 7/0617* (2013.01); *H04B 7/0626* (2013.01)

(58) Field of Classification Search
CPC .. H04B 7/0639; H04B 7/0469; H04B 7/0617; H04B 7/0626
(Continued)

(56) References Cited

U.S. PATENT DOCUMENTS 6,463,295 B1 * 10/2002 Yun .......................... H04L 1/20
455/522
6,983,127 B1 * 1/2006 Da Torre ............... H04B 17/10
455/25

(Continued)

FOREIGN PATENT DOCUMENTS

| CN | 106252901 A | 12/2016 |
|---|---|---|
| WO | 2015/021596 A1 | 2/2015 |
| WO | 2015/147445 A1 | 10/2015 |

OTHER PUBLICATIONS

International Search Report and Written Opinion dated Apr. 28, 2018 for PCT/CN2018/075545 filed on Feb. 7, 2018, 8 pages including Translation of the International Search Report.

(Continued)

*Primary Examiner* — April G Gonzales
(74) *Attorney, Agent, or Firm* — Xsensus LLP

(57) ABSTRACT

An electronic device for a wireless communication system includes processing circuitry configured to: perform control to transmit/receive signals to/from a target communication apparatus via an offset array antenna associated with the electronic device, wherein the offset array antenna comprises multiple sets of antenna elements, each has multiple antenna elements arranged in a first direction, a spatial offset and a phase difference in the first direction exist among the multiple sets of antenna elements, and the multiple sets of antenna elements are arranged in a second direction perpendicular to the first direction; and acquire a state of a channel in the first direction between the offset array antenna and the target communication apparatus, wherein the state of the (Continued)

COMMUNICATION APPARATUS 1100

COMMUNICATION APPARATUS 1200 channel in the first direction is determined using the signals which comprise the phase difference in the first direction.

16 Claims, 11 Drawing Sheets

(58) Field of Classification Search
USPC .................................................... 455/562.1
See application file for complete search history.

(56) References Cited

U.S. PATENT DOCUMENTS

| | | | |
|---|---|---|---|
| 7,035,661 B1* | 4/2006 | Yun .................. | H04W 52/42 |
| | | | 370/277 |
| 2002/0196182 A1* | 12/2002 | Guiraud .................. | H01Q 3/40 |
| | | | 342/373 |
| 2015/0358059 A1* | 12/2015 | Kim .................... | H04B 7/0617 |
| | | | 370/329 |
| 2017/0041068 A1* | 2/2017 | Murakowski ............ | H04B 7/08 |
| 2019/0004138 A1* | 1/2019 | Hafenecker ............... | G01S 1/20 |

OTHER PUBLICATIONS

Liu et al, "Low-Density Spatial RS Design and Channel Estimation For FDD Massive Full-Dimensional MIMO Systems", Signal and Information Processing (GlobalSIP), 2016 IEEE Global Conference, Dec. 9, 2016, 5 pages.
Samsung, "Configuration and control signaling for Rel.13 FD-MIMO", 3GPP TSG RAN WG1 Meeting No. 80 R1-150380, Athens, Greece, Feb. 9-13, 2015, pp. 1-5.

* cited by examiner

COMMUNICATION APPARATUS 1100

COMMUNICATION APPARATUS 1200

1000

2100

2200

2300

ELECTRONIC DEVICE, COMMUNICATION APPARATUS AND SIGNAL PROCESSING METHOD

CROSS-REFERENCE TO RELATED APPLICATIONS

The present application is based on PCT filing PCT/CN2018/075545, filed Feb. 7, 2018, which claims priority to P.R.C. patent application No. 201710100016.3 filed Feb. 23, 2017, and entitled "ELECTRONIC DEVICE, COMMUNICATION APPARATUS AND SIGNAL PROCESSING METHOD", the entire contents of each are incorporated herein by reference.

TECHNICAL FIELD

The present disclosure relates generally to an electronic device, a communication apparatus and a signal processing method. More specifically, the present disclosure relates to a technology of using an offset array antenna to perform communication.

BACKGROUND

By employing a linear signal processing algorithm with low complexity, a Massive Multiple-Input Multiple-Output (Massive MIMO) technology may simultaneously improve energy efficiency and spectral efficiency significantly, which has drawn extensive attention in academic and industrial fields. However, due to limitation in spatial size, it is very inconvenient to configure a massive Uniformly-spaced Linear Array (ULA) only in a horizontal direction in a real system. Therefore, a Three-Dimension Multiple-Input Multiple-Output (3D MIMO), also called Full-dimension MIMO, technology becomes a main implementation of a future massive MIMO technology in the real system.

The 3D MIMO technology is described in "Full-dimension MIMO (FD-MIMO) for next generation cellular technology," IEEE Commun. Mag., vol. 51, no. 6, pp. 172-179, June 2013. by Y. H. Nam, B. L. Ng, K. Sayana, Y. Li, J. Zhang, Y. Kim and J. Lee. By configuring Uniformly-spaced Planar Array (UPA) antennas at a base station end, 3D MIMO may provide an extra degree of freedom in a vertical direction, and perform beam-forming in the vertical direction. Meanwhile, the article also proposes a Kronecker product structure of a three dimensional space channel model. Many channel estimation, beam-forming and pre-coding algorithms reduce complexity of signal processing while improve 3D MIMO system performance based on this structure. In existing wireless communication standards, e.g. LTE/LTE-A, a codebook based on the Kronecker product structure is also widely used in the 3D MIMO system.

SUMMARY

However, 3D MIMO also has some defects. On the one hand, the inventors of the present disclosure have found that, when the same number of antenna elements are adopted, since users in the vertical direction are distributed within a relatively small region and non-uniformly, the resolution of UPA in the vertical direction is relatively low, this results in inaccurate estimation of an Angle-of-Arrival in Elevation domain (E-AoA) and a bad effect of beam-forming in the vertical direction, which causes relatively strong interference between users. On the other hand, the inventors of the present disclosure have also found that, when users are distributed densely in the horizontal direction, the resolution of UPA in the horizontal direction is inadequate, which also causes relatively strong interference between users.

Therefore, it is necessary to consider a new design scheme which is applicable to 3D MIMO to further develop potential of 3D MIMO. The present disclosure proposes a technology of using an Offset Array Antenna to perform communication. The technology may improve a resolution with respect to users, so that communication quality is improved.

According to one aspect of the present disclosure, there is provided an electronic device for a wireless communication system. The electronic device may comprise processing circuitry, the processing circuitry may be configured to: perform control to transmit/receive signals to/from a target communication apparatus via an offset array antenna associated with the electronic device, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction; and acquire a state of a channel in the first direction between the offset array antenna and the target communication apparatus, wherein the state of the channel in the first direction is determined using the signals which comprise the phase difference in the first direction.

According to another aspect of the present disclosure, there is provided a communication apparatus for a wireless communication system. The communication apparatus may comprise multiple sets of antenna elements, wherein each of the multiple sets of antenna elements has multiple antenna elements arranged in a first direction, and the multiple sets of antenna elements are arranged in a second direction perpendicular to the first direction. Wherein a spatial offset in the first direction and a phase difference in the first direction exist among the multiple sets of antenna elements, and the phase difference in the first direction is used to acquire a state of a channel in the first direction.

According to another aspect of the present disclosure, there is provided an electronic device for a wireless communication system. The electronic device may comprise processing circuitry, the processing circuitry may be configured to: receive signals from an offset array antenna associated with a target communication apparatus, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction; acquire a state of a channel in the first direction between the offset array antenna and an antenna associated with the electronic device, using the signals which comprise the phase difference in the first direction; and send information comprising indication of the state of the channel in the first direction to the target communication apparatus.

According to another aspect of the present disclosure, there is provided an electronic device. The electronic device may comprise processing circuitry, the processing circuitry may be configured to: receive signals from an offset array antenna associated with a target communication apparatus, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction; acquire offset information on the offset array antenna; determine an offset codebook for the offset array antenna based on the offset information and the signals.

According to another aspect of the present disclosure, there is provided a signal processing method for a wireless communication system. The method may comprise: transmitting/receiving signals to/from a second communication apparatus via an offset array antenna associated with a first communication apparatus, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction; and acquiring a state of a channel in the first direction between the first communication apparatus and the second communication apparatus, wherein the state of the channel in the first direction is determined using the signals which comprise the phase difference in the first direction.

According to another aspect of the present disclosure, there is provided a signal processing method for a wireless communication system. The method may comprise: receiving, by a second communication apparatus, signals from an offset array antenna associated with a first communication apparatus, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction; acquiring a state of a channel in the first direction between the first communication apparatus and the second communication apparatus, using the signals which comprise the phase difference in the first direction; and sending information comprising indication of the state of the channel in the first direction to the first communication apparatus.

According to another aspect of the present disclosure, there is provided a computer-readable storage medium. The computer-readable storage medium may have instructions stored thereon which when executed by a processor cause the processor to perform any one of the above mentioned methods.

DRAWINGS

DETAILED DESCRIPTION

Figure 1:
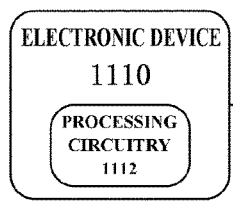
FIG. 1 illustrates a schematic view of a communication system according to an embodiment of the present disclosure.
Figure 1:
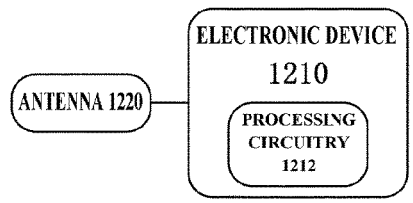

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. System Overview
2. Configuration of Antenna
3. Process in Communication Apparatus
4. Simulation Result
5. Application Examples
6. Conclusion

1. SYSTEM OVERVIEW

FIG. 1 illustrates a schematic view of a communication system 1000 according to an embodiment of the present disclosure. The communication system 1000 may include a communication apparatus 1100 and a communication apparatus 1200 which perform wireless communication with each other.

The communication apparatus 1100 may include an electronic device 1110 and an antenna 1120. In addition, the communication apparatus 1100 may also include other components not shown, such as a radio frequency link, a baseband processing unit, a network interface, a processor, a memory, a controller, etc. The electronic device 1110 may be associated with the antenna 1120. For example, the electronic device 1110 may be connected to the antenna 1120 directly or indirectly (e.g., other components may be connected therebetween), transmit a radio signal via the antenna 1120 as well as receive a radio signal via the antenna 1120.

The electronic device 1110 may include processing circuitry 1112. In addition, the electronic device 1110 may also include an input and output interface and a memory, etc. The processing circuitry 1112 in the electronic device 1110 may output a signal (digital or analog) to other components in the communication apparatus 1100, and may also receive a signal (digital or analog) from other components in the communication apparatus 1100. In addition, the processing circuitry 1112 may also control a part or all of operations of other components in the communication apparatus 1100.

The processing circuitry 1112 may be in the form of a general-purpose processor, and may also be special-purpose processing circuitry, e.g. ASIC. For example, the processing circuitry 1112 can be configured by circuitry (hardware) or a central processing device (such as, a Central Processing Unit (CPU)). In addition, the processing circuitry 1112 may bear program (software) for causing the circuitry (hardware) or the central processing device to work. The program can be stored in a memory (such as, arranged in the communication apparatus 1100 or the electronic device 1110) or an external storage medium externally connected, or downloaded via a network (such as, Internet).

Although FIG. 1 illustrates that the electronic device 1110 and the antenna 1120 are separated, the electronic device 1110 may also be implemented to include the antenna 1120. In addition, the electronic device 1110 may also be implemented to include one or more other components in the communication apparatus 1100, or the electronic device 1110 may be implemented as the communication apparatus 1100 itself. In a real implementation, the electronic device 1110 may be implemented as a chip (such as an integrated circuit module including a single wafer), a hardware component or an entire product.

The above description of the structure of the communication apparatus 1100 is applicable to the communication apparatus 1200 likewise, and description of the detailed structure of the communication apparatus 1200 is no longer repeated herein. The communication system 1000 may be a cellular communication system, a Machine Type Communication (MTC), a self-organizing network or a cognitive radio system (e.g. IEEE P802.19.1a and a Spectrum Access System (SAS)), etc.

The communication apparatus 1100 may be implemented as a base station, a small base station, a Node B, an e-NodeB, a relay, etc, in the cellular communication system, a terminal device in the machine type communication system, a sensor node in the self-organizing network, a coexistence manager (CM) and SAS in the cognitive radio system, etc. For example, the communication apparatus 1100 may be implemented as any type of evolved Node B (eNB) such as a macro eNB (associated with a macro cell) and a small eNB (associated with a small cell). A small eNB may be an eNB that covers a cell smaller than a macro cell, such as a pico eNB, a micro eNB, and a home (femto) eNB. Alternatively, the communication apparatus 1100 may be implemented as any other type of base station, such as a network node in a next generation network, e.g., a gNB, a NodeB and a base transceiver station (BTS). The communication apparatus 1100 may include a main body (also referred to as a base station device) configured to control wireless communication and one or more remote radio heads (RRHs) disposed at different locations from the main body. Further, various types of terminals to be described below may operate as the communication apparatus 1100 by performing a base station function temporarily or semi-permanently.

The communication apparatus 1200 may be implemented as a terminal device or a user equipment. For example, the communication apparatus 1200 may be implemented as a mobile terminal such as a smartphone, a tablet personal computer (PC), a notebook PC, a portable game terminal, a portable/dongle mobile router and a digital camera, or an in-vehicle terminal such as a car navigation device. The communication apparatus 1200 may further be implemented as a terminal that performs machine to machine (M2M) communication (also referred to as a machine type communication (MTC) terminal). Furthermore, the communication apparatus 1200 may be a wireless communication module (such as an integrated circuit module including a single wafer) mounted on each of the above terminals. The communication apparatus may also be implemented as an intelligent electric meter, an intelligent household appliance, or a Geolocation Capability Object (GCO) in the cognitive radio system, a Citizens Broadband Radio Service Device (CBSD).

Although FIG. 1 illustrates that the communication apparatus 1100 communicates with one communication apparatus 1200, the communication apparatus 1100 may communicate with a plurality of communication apparatuses 1200, the communication apparatus 1200 may communicate with a plurality of communication apparatuses 1100 (e.g., in the case of Coordinated Multiple Points).

2. CONFIGURATION OF ANTENNA

[2-1. Conventional Planar Array Antenna]

Figure 2A:
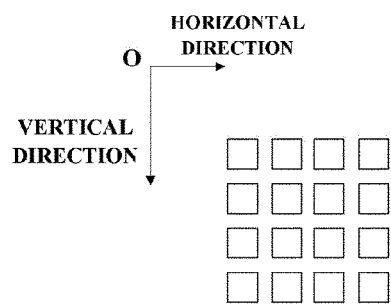
FIG. 2A illustrates a schematic view of a 4×4 (4 rows×4 columns) conventional planar array antenna.

FIG. 2A illustrates a schematic view of a 4×4 (4 rows×4 columns) conventional planar array antenna 2100. In the conventional planar array antenna 2100 of FIG. 2A, corresponding antenna elements of respective columns of antenna elements in a vertical direction are aligned in a horizontal direction. For example, 1st, 2nd, 3rd and 4th antenna elements of a 1st column of antenna elements are aligned with 1st, 2nd, 3rd and 4th antenna elements of any of 2nd~4th columns in the horizontal direction, respectively. In addition, in the conventional planar array antenna 2100 of FIG. 2A, corresponding antenna elements of respective rows of antenna elements in the vertical direction are aligned in the vertical direction. For example, 1st, 2nd, 3rd and 4th antenna elements of a 1st row of antenna elements are aligned with 1st, 2nd, 3rd and 4th antenna elements of any of 2nd~4th rows in the horizontal direction, respectively. An i th column/row of antenna elements as used herein refers to a m th column/row of antenna elements from a leftmost/uppermost side of the array antenna, a n th antenna element of the m th column/row of antenna elements as used herein refers to the n th antenna element from an uppermost/leftmost side of the m th column/row of antenna elements, both m and n are positive integers, and the description is likewise applicable to other array antennas described later.

Resolution or distinguishment of users in the vertical/horizontal direction by the planar array antenna is limited by the number of antenna elements thereof in the vertical/horizontal direction. The more the number of antenna elements of the planar array antenna in the vertical/horizontal direction, the better it can distinguish users in the vertical/horizontal direction.

It is assumed that a base station of a uniformly-spaced planar array antenna of M×M (with the same horizontal and vertical gaps between adjacent antenna elements) serves K single-antenna users simultaneously. $H_k \in C^{M \times M}$ is recorded as a downlink channel matrix between the base station and a kth user. In a case where a three dimensional space channel model is adopted, a narrowband multipath channel coefficient may be expressed as $$H_k = \Sigma_p^P \rho_{k,p} h_{k,p}^e \otimes (h_{k,p}^a)^T. \quad \text{(formula 1)}$$

P denotes the number of multiple paths, $\rho_{k,p}$ denotes a large scale fading coefficient of a pth path of a kth user, and $h_{k,p}^e$ and $h_{k,p}^a$ are a vertical direction channel steering vector and a horizontal direction channel steering vector, respectively, and may be expressed as $$h_{k,p}^e = \left[1, e^{-j2\pi \frac{D}{\lambda} \sin\beta_{k,p}}, \ldots, e^{-j2\pi(M-1)\frac{D}{\lambda}\sin\beta_{k,p}}\right]^T \quad \text{(formula 2)}$$

$$h_{k,p}^a = \left[1, e^{-j2\pi \frac{D}{\lambda} \cos\beta_{k,p} \cos\theta_{k,p}}, \ldots, e^{-j2\pi(M-1)\frac{D}{\lambda}\cos\beta_{k,p}\cos\theta_{k,p}}\right]^T. \quad \text{(formula 3)}$$

D and λ denote antenna gap and wavelength. Usually, when a half wavelength antenna is adopted, D/λ=0.5. $\theta_{k,p}$ and $\beta_{k,p}$ denote a horizontal angle of arrival (A-AoA) and a vertical angle of arrival (E-AoA) of the pth path respectively. It may be seen that, $H_k$ satisfies the Kronecker product structure. With respect to a Line-of-Sight (LOS) channel, P=1, a channel coefficient thereof may be decided by an angle of arrival of a main path. For example, in a millimeter wave communication system, an indirect path has large path loss, therefore a direct path is a main channel scene.

If a location-based angle of arrival estimation algorithm which is applicable to 3D MIMO, introduced in "Location-based channel estimation and pilot assignment for massive MIMO systems," in Proc. ICC 2015 Workshops (London, UK), Jun. 8-12, 2015, pp. 1264-1268. by Z. Wang, C. Qian, L. Dai, J. Chen, C. Sun and S. Chen as well as a patent application No. 201410386345.5 filed on Aug. 7, 2014, by the same applicant(s) of the present application, and entitled "Apparatus, electronic device and method thereof for wireless communication", which is incorporated herein by reference in its entirety, is adopted, the vertical angle of arrival and the horizontal angle of arrival may be estimated according to the method below.

By adopting a line-of-sight channel, H is recorded as a channel matrix obtained by using reference signal estimation, E-AoA and A-AoA are record as β and θ. $h_e$ is recorded as a 1st column (may also be another column) of $\hat{H}$, it denotes channel estimation results of the 1st column of respective antenna elements of a uniformly-spaced planar array antenna of M×M. By adopting Discrete Fourier Transformation (DFT), a vertical direction channel vector $\tilde{h}_e \in C^{M \times 1}$ of an angle domain may be expressed as $$\tilde{h}_e = F_M h_e. \quad \text{(formula 4)}$$

$F_M$ is a M th order DFT matrix. By selecting a location of the largest amplitude of $\tilde{h}_e$ (i.e. a location of an element having the largest amplitude of respective elements of the vector $\tilde{h}_e$), it is possible to estimate and obtain an estimation value $\hat{\beta}$ of E-AoA as follows.

$$n_e = \arg\max_{0 \leq n \leq M-1} |\tilde{h}_e| \quad \text{(formula 5)}$$

$$\hat{\beta} = \arcsin\frac{\lambda}{D}\left(1 - \frac{n_e}{M}\right). \quad \text{(formula 6)}$$

$n_e$ is a largest amplitude location index.

In addition, it is possible to adopt similar steps to estimate A-AoA. $h_a$ is recorded as a first row (may also be another row) of H, it denotes channel estimation results of the 1st row of respective antenna elements of a uniformly-spaced planar array antenna of M×M. A horizontal direction channel vector $\tilde{h}_a \in C^{M \times 1}$ of the angle domain may be expressed as $$\tilde{h}_a = F_M h_a. \quad \text{(formula 7)}$$

Considering that horizontal direction angle distribution is from 0 to 180 degrees, it is possible to estimate and obtain A-AoA as follows $$n_a = \arg\max_{0 \leq n \leq M-1} |\tilde{h}_a| \quad \text{(formula 8)}$$

$$\hat{\theta} = \begin{cases} \arccos\frac{\lambda}{D\cos\hat{\beta}}\left(1 - \frac{n_a}{M}\right), n_a \geq M/2 \\ \arccos-\frac{n_a}{M}\frac{\lambda}{D\cos\hat{\beta}}, n_a < M/2 \end{cases} \quad \text{(formula 9)}$$

Where $n_a$ is a largest amplitude location index. By estimating angles of arrival $\hat{\theta}$ and $\hat{\beta}$, it is possible to generate the vertical direction and horizontal direction channel vectors, and use the Kronecker product to recover channels to be estimated.

It may be seen that, the estimation value $\hat{\beta}$ of E-AoA have M possible values. The M possible values are discretely distributed in an interval of [0, π/2] (i.e. the value range of the vertical angle of arrival). That is, the number of possible values of the estimation value $\hat{\beta}$ of E-AoA depends on the number M of antenna elements in the vertical direction of the array antenna. The larger the value of M, the more the number of possible values of the estimation value $\hat{\beta}$ of E-AoA, the finer the division of the value range [0, π/2] of the vertical angle of arrival. Therefore, it is possible to estimate the vertical angle of arrival of the user more accurately, and distinguish users in the vertical direction better, reduce interference between users.

Further, in addition to the above mentioned location-based angle of arrival estimation algorithm, it is also possible to adopt algorithms such as MUSIC, ESPRIT, etc, to estimate the vertical angle of arrival and the horizontal angle of arrival. Similarly, the accuracy of the vertical angle of arrival estimated by algorithms such as MUSIC, ESPRIT, etc, is also limited by the number M of antenna elements in the vertical direction of the array antenna. Therefore, in the case of adopting algorithms such as MUSIC, ESPRIT, etc, increase in the number of antenna elements in the vertical direction of the array antenna may also improve estimation accuracy of the vertical angle of arrival.

On the other hand, the number of beams which the planar array antenna can transmit within a vertical plane is limited by the number of antenna elements in the vertical direction of the planar array antenna. For example, with respect to a uniformly-spaced planar array antenna of M×M, it can transmit M beams in different directions within the vertical plane. Angles of these M beams are, within the vertical plane, discretely distributed in an interval of [0, π/2]. Therefore, the more the number of antenna elements in the vertical direction (the larger the value of M), the more the number of beams transmitted from the uniformly-spaced planar array antenna of M×M and separated within the vertical plane (i.e. having different angles with respect to the vertical direction), the finer the division of the vertical angle interval [0, π/2] by these beams. Therefore, these beams can aim at uses more accurately, and improve communication quality of users. In addition, if the number of antenna elements in the vertical direction is more (the value of M is larger), these beams have narrow widths, higher gains, so that communication quality of users can also be improved.

However, the number of antenna elements in the vertical direction can not be infinitely increased, because the total number of antenna elements is limited. Therefore, the resolution of users in the vertical direction is limited.

Similarly, the resolution of users in the horizontal direction is limited by the number of antenna elements in the horizontal direction.

The present disclosure proposes to use an offset array antenna to improve the resolution of users in the case of using the same number (the total number of antenna elements) of antenna elements as that of a conventional planar array antenna, thereby improve communication quality. Hereinafter, an offset array antenna according to an embodiment of the present disclosure will be described.

[2-2. Offset Array Antenna]

Figure 2B:
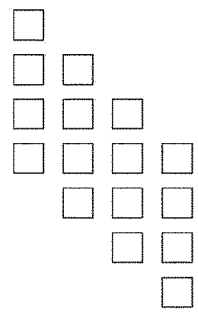
FIGS. 2B and 2C illustrate schematic views of offset array antennas which may be used according to an embodiment of the present invention.
Figure 2C:
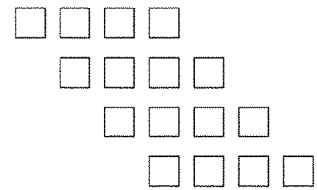

FIGS. 2B and 2C illustrate schematic views of offset array antennas 2200, 2300 which may be used according to an embodiment of the present invention. For easy comparison with the conventional planar array antenna 2100 in FIG. 2A, the offset array antennas 2200, 2300 shown in FIGS. 2B and 2C are configured with the same number of antenna elements as the conventional planar array antenna 2100.

The offset array antenna 2200 in FIG. 2B is a Vertical Offset Array Antenna, i.e. respective columns of antenna elements are offset in the vertical direction. In the offset array antenna 2200, a certain column of antenna elements may be selected as a reference set of antenna elements (e.g. a 1st column or any other column), other columns of antenna elements have spatial offsets in the vertical direction with respect to the reference set of antenna elements. That is, there are spatial offsets in the vertical direction between corresponding antenna elements of each column of antenna elements. For example, there are spatial offsets in the vertical direction between 4 1st antenna elements of 1st~4th columns of antenna elements, and so on.

The offset array antenna 2300 in FIG. 2C is a Horizontal Offset Array Antenna, i.e. respective rows of antenna elements are offset in the horizontal direction. In the offset array antenna 2300, a certain row of antenna elements may be selected as a reference set of antenna elements (e.g. a 1st row or any other row), other rows of antenna elements have spatial offsets in the horizontal direction with respect to the reference set of antenna elements. That is, there are spatial offsets in the horizontal direction between corresponding antenna elements of each row of antenna elements. For example, there are spatial offsets in the horizontal direction between 4 1st antenna elements of 1st~4th rows of antenna elements, and so on.

It is possible to divide antenna elements of the offset array antenna into one or more sets of antenna elements. For example, it is possible to divide antenna elements of the vertical offset array antenna 2200 into sets by the column, one column of antenna elements of the vertical offset array antenna 2200 may be called one set of antenna elements. Therefore, in the vertical offset array antenna 2200, respective antenna elements in the same set of antenna elements are aligned in the vertical direction. Similarly, it is possible to divide antenna elements of the horizontal offset array antenna 2300 into sets by the row, one row of antenna elements of the horizontal offset array antenna 2300 may be called one set of antenna elements. Therefore, in the horizontal offset array antenna 2200, respective antenna elements in the same set of antenna elements are aligned in the horizontal direction.

The alignment direction of respective antenna elements in the same set of antenna elements of the offset array antenna may be called a first direction of the offset array antenna. The first direction may be the horizontal direction or the vertical direction, may also be a certain direction between the horizontal direction and the vertical direction. Respective sets of antenna elements of the offset array antenna are arranged in a second direction perpendicular to the first direction.

Respective antenna elements in the same set of antenna elements of the offset array antenna may have uniform gaps in the first direction (which may be called intra-group gap). In addition, respective sets of antenna elements of the offset array antenna may have uniform gaps in the second direction (which may be called inter-group gap). When the intra-group gap and the inter-group gap are the same, the offset array antenna may be called an offset uniform array antenna or an offset uniformly-spaced planar array antenna. In addition, the intra-group gap and the inter-group gap may also be different.

In some embodiments, respective antenna elements in the same set of antenna elements of the offset array antenna may have non-uniform intra-group gaps in the first direction. In addition, respective sets of antenna elements of the offset array antenna may have non-uniform inter-group gaps in the second direction. The non-uniform intra-group gaps and the non-uniform inter-group gaps may be determined according to a method recorded in Patent Application No. 201610051745.X filed on Jan. 26, 2016, by the same applicant(s) of the present application, and entitled "非均匀天线阵列及其信号处理", which is incorporated herein by reference in its entirety.

Respective sets of antenna elements of the offset array antenna may have a certain spatial offset in the first direction, the spatial offset may be called an inter-group offset. The inter-group offset may be equal to or approximately equal to the intra-group gap, may also be two or more times of the intra-group gap, or may be other values which are more than the intra-group gap. In addition, the inter-group offset may also be ½ of the intra-group gap, or may be other values which are less than the intra-group gap.

[2-3. Offset Antenna Element and Pseudo Antenna Element]

Of respective antenna elements of respective sets of antenna elements of the offset array antenna, an antenna element which has a spatial offset in the first direction with respect to each antenna element of the reference set of antenna elements may be called an offset antenna element.

In addition, there are also spatial offsets in the first direction between multiple offset antenna elements. That is, one offset antenna element is not aligned with each antenna element of the reference set of antenna elements in the second direction, and any two offset antenna elements are not aligned in the second direction. Pseudo antenna elements corresponding to the offset antenna elements may be defined, the pseudo antenna elements are aligned with the reference set of antenna elements in the first direction.

Figure 3A:
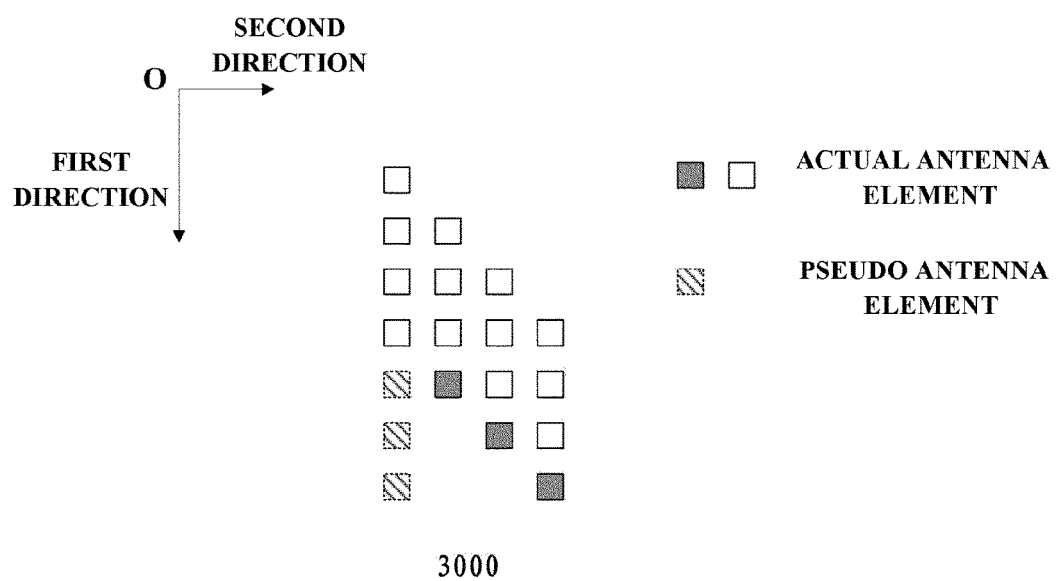
FIG. 3A illustrates offset antenna elements and pseudo antenna elements of an offset array antenna.

FIG. 3A illustrates offset antenna elements and pseudo antenna elements of an offset array antenna 3000. In FIG. 3A, a 1st column of antenna elements are used as a reference set of antenna elements, solid squares in 2nd~4th columns denote offset antenna elements, diagonal line squares below the 1st column denote pseudo antenna elements (antenna elements which actually do not exist). Since an antenna element represented by a solid square in FIG. 3A has a spatial offset in the first direction with respect to each antenna element of the reference set of antenna elements (i.e. they are not aligned in the second direction), and antenna elements represented by any two solid squares have a spatial offset in the first direction (i.e. they are not aligned in the second direction), these solid squares may be selected as offset antenna elements.

According to an embodiment of the present disclosure, the reference set of antenna elements and one or more offset antenna elements (or all offset antenna elements) may be used to improve a user resolution in the first direction. This is because, an offset antenna element may correspond to a pseudo antenna element which is aligned with the reference set of antenna elements in the first direction. For example, by performing phase compensation on the offset antenna element in the second direction, a signal transmitted from/received by the offset antenna element may be considered as a signal transmitted from/received by the pseudo antenna element corresponding to the offset antenna element. Therefore, without increasing the number of actual antenna elements, the number of antenna elements in the first direction of the offset array antenna is increased equivalently, so that the user resolution in the first direction may be improved.

In addition, with respect to the conventional planar array antenna 2100, if one or more antenna elements are damaged or absent, it is also possible to define a reference set of antenna elements, offset antenna elements and/or pseudo antenna elements for the conventional planar array antenna 2100, and use the reference set of antenna elements and the offset antenna elements to improve the user resolution in the first direction. In this case, definitions of offset antenna elements and pseudo antenna elements are the same as offset antenna elements and pseudo antenna elements of the offset array antenna.

Figure 3B:
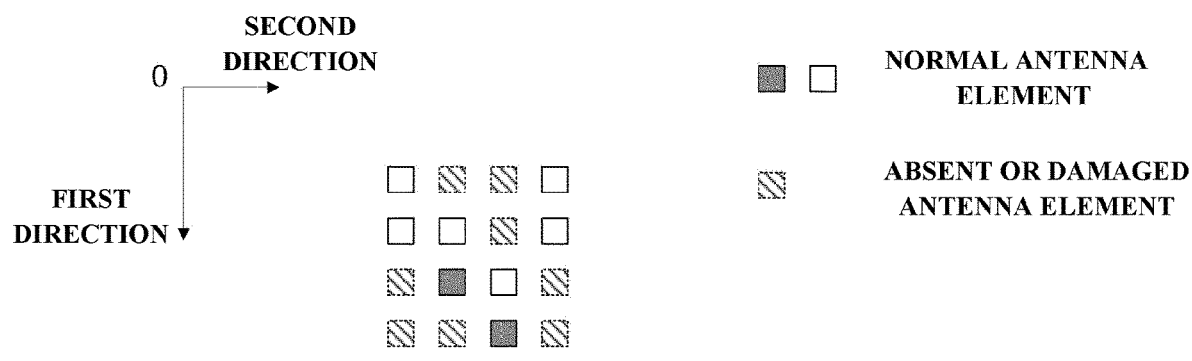
FIG. 3B illustrates a conventional planar array antenna having one or more absent or damaged antenna elements.

FIG. 3B illustrates a conventional planar array antenna 3100 having one or more absent or damaged antenna elements. Here, an absent or damaged antenna element means that the antenna element is damaged (can not work normally), or there is no actual antenna element in the position of the antenna element. In FIG. 3B, since the number of normal antenna elements (antenna elements which may work normally) in the first direction of users decreases from 4 to 2, the user resolution in the first direction of the antenna 3100 is reduced. Therefore, for example, it is possible to select a 1st column (or another column) as a reference set of antenna elements, and define offset antenna elements (shown by solid squares) in 2nd, 3rd columns. In this case, the lowermost two diagonal line squares in the 1st column denote pseudo antenna elements corresponding to offset antenna elements. The reference set of antenna elements and the offset antenna elements may be used to improve the user resolution in the first direction of the antenna 3100. The principle thereof is similar to the offset array antenna 3000 in FIG. 3A.

Since the principles of using offset antenna elements to improve the user resolution in the first direction in the offset array antenna and the array antenna having absent or damaged antenna elements are the same, processes described with respect to the offset array antenna are applicable to the array antenna having absent or damaged antenna elements likewise.

Figures 4A, 4B, 4C:
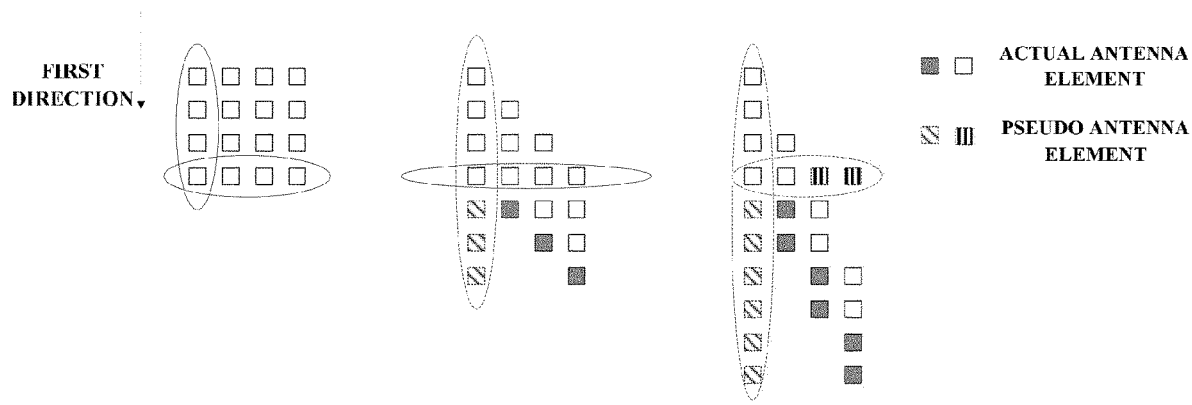
FIG. 4A-4C illustrate offset antenna elements and pseudo antenna elements of offset array antennas having various inter-group offsets.

FIG. 4A-4C illustrate offset antenna elements and pseudo antenna elements of offset array antennas having various inter-group offsets. In FIG. 4A, the inter-group offset is 0, therefore there is no offset antenna element and pseudo antenna element. In the case of FIG. 4A, the offset array antenna degrades into the conventional planar array antenna. In FIG. 4B, the inter-group offset is the intra-group gap, the lowermost 1 antenna elements in 2nd~4th columns of antenna elements are selected as offset antenna elements, the number of pseudo antenna elements is 3 accordingly. In FIG. 4C, the inter-group offset is 2 times of the intra-group gap, therefore, the lowermost 2 antenna elements in 2nd~4th columns of antenna elements are selected as offset antenna elements, and the number of pseudo antenna elements also increases to 6 accordingly.

In FIGS. 4A and 4B, in the second direction, there is at least one row of antenna elements which have the following features: the row of antenna elements are aligned in the second direction, and the number of the row of antenna elements is the same as the number of columns of the offset array antenna. However, in FIG. 4C, there is no such one row of antenna elements. Therefore, in FIG. 4C, offset antenna elements and pseudo antenna elements (vertical line squares in FIG. 4C) in the second direction may be further defined, so that the user resolution in the second direction may be improved.

Figures 5A, 5B:
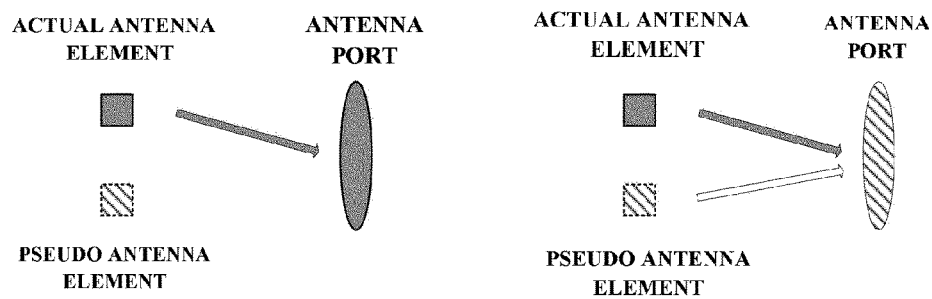
FIGS. 5A-5C illustrate possible mapping relations between offset array antennas and antenna ports according to an embodiment of the present disclosure.
Figures 5C, 5D:
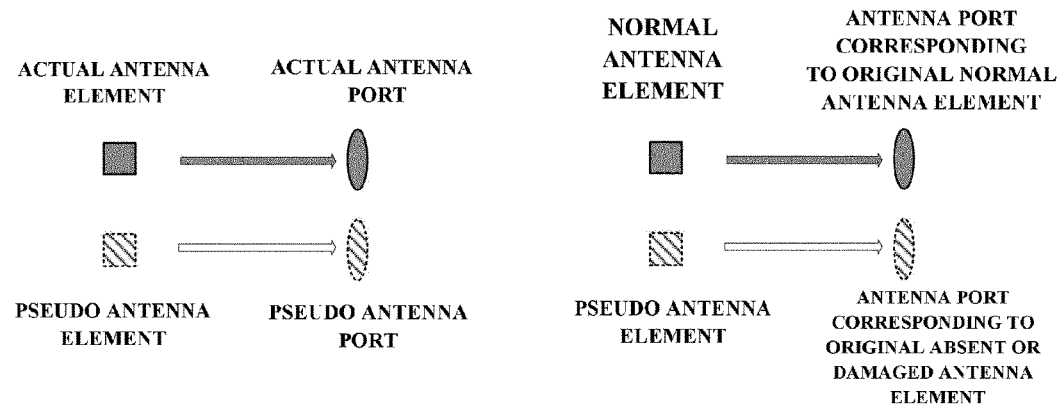
FIG. 5D illustrates possible mapping relations between array antennas having absent or damaged antenna elements and antenna ports according to an embodiment of the present disclosure.

FIGS. 5A-5C illustrate possible mapping relations between offset array antennas and antenna ports according to an embodiment of the present disclosure. In FIG. 5A, there is no mapping between a pseudo antenna element and an antenna port, only an actual antenna element group is mapped to the antenna port, this is compatible with prior standards. In FIG. 5B, the pseudo antenna element and the actual antenna element are mapped to the same antenna port. In FIG. 5C, the pseudo antenna element and the actual antenna element are mapped to different antenna ports, the pseudo antenna element is mapped to a pseudo antenna port.

FIG. 5D illustrates possible mapping relations between array antennas having absent or damaged antenna elements and antenna ports according to an embodiment of the present disclosure. In FIG. 5D, a normal antenna element is mapped to an actual antenna port corresponding to an original normal antenna element, the pseudo antenna element is mapped to an actual antenna port corresponding to an original absent or damaged antenna element. Since the actual antenna port corresponding to the original absent or damaged antenna element may be the same as the actual antenna port corresponding to the normal antenna element, the pseudo antenna element may be the same as the actual antenna port corresponding to the normal antenna element.

The above mentioned several different mapping schemes may be adjusted flexibly according to different offset uniformly-spaced planar array configurations, a status of absent or damaged antennas as well as different application demands.

[2-4. Offset Codebook]

An offset codebook is a codebook for performing precoding or beam-forming on the offset array antenna. The offset codebook may be obtained by adding a phase offset in a first direction to a technology of a non-offset codebook for a conventional planar array antenna.

The offset array antenna 3000 in FIG. 3 is taken as an example to explain a method of determining the offset codebook. It is assumed that the offset array antenna 3000 is a vertical offset array antenna, and both an inter-group interval and an intra-group interval are D. Since there are offsets in the vertical direction between respective columns of antenna elements, the horizontal direction channel steering vector of the offset array antenna 3000 becomes the following formula from formula 3:

$$h_{k,p}^{a,\text{offset}} = \left[1, e^{-j2\pi\frac{D}{\lambda}(\cos\beta_{k,p}\cos\theta_{k,p} + \sin\beta_{k,p})}, \right.$$
$$\left. \ldots, e^{-j2\pi(M-1)\frac{D}{\lambda}(\cos\beta_{k,p}\cos\theta_{k,p} + \sin\beta_{k,p})}\right] \quad \text{(formula 10)}$$

In comparison with formula 3, the horizontal direction channel steering vector of the offset array antenna 3000 has an extra term $$e^{-j2\pi\frac{D}{\lambda}\sin\beta_{k,p}},$$

the term reflects phase offsets in the vertical direction of the offset array antenna 3000, i.e.

$$2\pi\frac{D}{\lambda}\sin\beta_{k,p}.$$

Then, it is possible to, according to formula 1, obtain an offset narrowband multipath channel coefficient matrix of the offset array antenna 3000

$$H_k^{\text{offset}} = \Sigma_p^P \rho_{k,p} h_{k,p}^e \otimes (h_{k,p}^{a,\text{offset}})^T. \quad \text{(formula 11)}$$

By quantizing the channel coefficient matrix $H_k^{\text{offset}}$ to which vertical phase offsets have been added, it is possible to obtain multiple codewords for performing precoding or beam-forming on the offset array antenna 3000. The multiple codewords form a codebook for the offset array antenna 3000. The offset codebook is an offset Kronecker product DFT codebook.

Hereinabove, an offset array antenna according to an embodiment of the present disclosure has been described, hereinafter, preferable embodiments of processes of using the offset array antenna to improve the user resolution in the first direction (horizontal, vertical, or another direction) will be described.

3. PROCESS IN COMMUNICATION APPARATUS

Hereinbelow, processes of communication apparatuses 1100 and 1200 will be described in a case where it is assumed that the communication apparatus 1100 is a base station and the communication apparatus 1200 is a user equipment, and communication from the communication apparatus 1100 to the communication apparatus 1200 is called downlink, communication from the communication apparatus 1200 to the communication apparatus 1100 is called uplink. It is noted that in a case where the communication apparatus 1100 is not a base station and the communication apparatus 1200 is not a user equipment, the communication apparatuses 1100 and 1200 may also execute the processes described below. In addition, a part or all of the processes executed by the communication apparatuses 1100 and 1200 described below may be executed by the processing circuitry 1112 and 1212, may also be executed by the processing circuitry 1112 and 1212 controlling other components in the communication apparatuses 1100 and 1200 and/or components in other apparatuses.

[3-1. Process in Communication Apparatus 1100]

The communication apparatus 1100 may transmit a signal to the communication apparatus 1200 or receive a signal from the communication apparatus 1200 via the antenna 1120. The antenna 1120 of the communication apparatus 1100 may be the offset array antenna as described above.

There may be phase differences in the first direction between respective sets of antenna elements of the antenna 1120. On the one hand, since there are spatial offsets in the first direction between respective sets of antenna elements of the antenna 1120, there are path differences in the first direction between paths by which signals arrive at respective sets of antenna elements, there are phase differences corresponding to path differences in the first direction between signals received via respective sets of antenna elements of the antenna 1120. On the other hand, when signals are transmitted by way of the antenna 1120, it is possible to cause signals transmitted on respective sets of antenna elements have phase differences corresponding to path differences in the first direction, so that a superposed signal of signals transmitted on respective sets of antenna elements can be better received at the communication apparatus 1200.

For example, it is possible to cause an antenna element in a set of antenna elements of the antenna 1120 to have a phase difference in the first direction with respect to a corresponding antenna element in another set of antenna elements. For example, in the vertical offset array antenna 2200 of FIG. 2B, there are phase differences in the vertical direction between the 1st antenna elements of respective columns of antenna elements, i.e. phase differences corresponding to path differences in the vertical direction. In the horizontal offset array antenna 2300 of FIG. 2C, there are phase differences in the horizontal direction between the 1st antenna elements of respective rows of antenna elements, i.e. phase differences corresponding to path differences in the horizontal direction.

In addition, since respective sets of antenna elements of the antenna 1120 themselves are the linear array antenna, there are also phase differences in the first direction between respective antenna elements in the same set of antenna elements. Therefore, here, phase differences in the first direction between respective sets of antenna elements may be called inter-group phase differences in the first direction, phase differences between respective antenna elements within the same set of antenna elements may be called intra-group phase differences. The inter-group phase differences in the first direction may be determined by phase differences in the first direction between corresponding antenna elements of respective sets of antenna elements (e.g., 1st antenna elements of respective sets of antenna elements). In addition, since respective sets of antenna elements are alternately arranged in the second direction, there are also phase differences in the second direction between respective sets of antenna elements, which may be called inter-group phase differences in the second direction.

By using a signal which has the inter-group phase difference in the first direction and is transmitted or received via the antenna 1120, the communication apparatus 1100 may obtain a state of a channel in the first direction between the communication apparatus 1100 and the communication apparatus 1200. The state of the channel may be a state of an uplink channel from the communication apparatus 1200 to the communication apparatus 1100, may also be a state of a downlink channel from the communication apparatus 1100 to the communication apparatus 1200. The state of the channel may include channel quality, channel direction (e.g., a channel steering vector, an angle of arrival or an optimal beam for the communication apparatus 1200, etc).

In the process of determining the above mentioned state of the channel, the communication apparatus 1100 may use the reference set of antenna elements as well as at least one offset antenna element of the antenna 1120. There are phase differences in the first direction as well as phase differences in the second direction between the offset antenna elements and the reference set of antenna elements. By compensating phase differences in the second direction of the offset antenna elements, the communication apparatus 1100 may eliminate phase differences in the second direction between the offset antenna elements and the reference set of antenna elements. Therefore, the offset antenna elements after phase compensation and the reference set of antenna elements constitute one equivalent linear array antenna, and in the first direction, the linear array antenna has the more number of antenna elements than the reference set of antenna elements, so that the user resolution in the first direction can be improved.

The above mentioned phase compensation may be achieved in an analog domain, e.g. by adding phase shifters upstream of the offset antenna elements, signals undergo phase shift by the phase shifters before signals are transmitted via the offset antenna elements. The above mentioned phase compensation may also be performed by signal processing in a digital domain, e.g., the offset antenna array is connected to a precoding module, so that signals are multiplied by corresponding precoding coefficients before signals are transmitted via the reference set of antenna elements and the offset antenna elements. By performing phase compensation on precoding coefficients of the offset antenna elements, it is possible to achieve phase compensation on the offset antenna elements. In addition, with respect to the array antenna, each antenna element originally connects to one phase shifter, therefore, it is also possible to use such originally existing phase shifters to perform the above mentioned phase compensation on the offset antenna elements (e.g., by adjusting phase values of the phase shifters).

The communication apparatus 1100 may use the antenna 1120 to perform downlink beam training (e.g., transmit a beam-formed cell-specific reference signal), and determine an optimal beam for transmitting a downlink signal to the communication apparatus 1200 according to feedback from the communication apparatus 1200. In an example in which uplink and downlink channels do not have reciprocity, e.g. a part of FDD systems, the base station may determine the beam for downlink transmission by downlink beam training.

Figure 6:
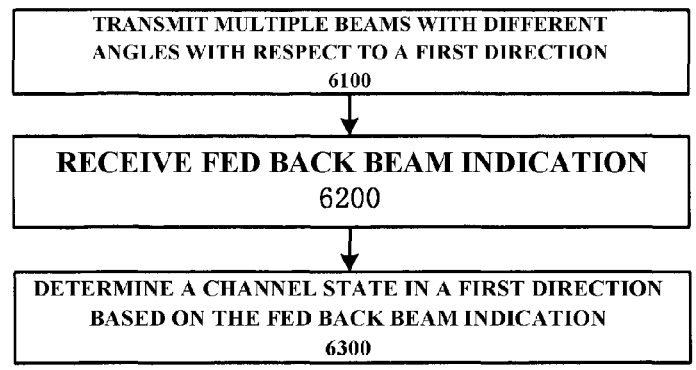
FIG. 6 illustrates a process flow of a communication apparatus performing downlink beam training according to an embodiment of the present disclosure.

FIG. 6 illustrates a process flow of a communication apparatus 1100 performing downlink beam training according to an embodiment of the present disclosure. In step 6100, the communication apparatus 1100 may transmit multiple beams with different angles with respect to the first direction using the reference set of antenna elements and the at least one offset antenna element.

For example, the communication apparatus 1100 may first compensate phase differences in the second direction of the offset antenna elements with respect to the reference set of antenna elements. For example, with respect to the offset array antenna 3000 in FIG. 3, the offset antenna elements (solid squares) of the 2nd~4th columns of antenna elements have 1, 2, 3 times of the inter-group gap in the second direction with respect to the reference set of antenna elements, respectively. Therefore, with respect to the offset antenna elements (solid squares) of the 2nd~4th columns of antenna elements in FIG. 3, it is necessary to compensate 1, 2, 3 times of the inter-group phase difference in the second direction, respectively.

Taking the offset array antenna 3000 in FIG. 3 as an example, it is assumed that the offset array antenna 3000 is a vertical offset array antenna, and both an inter-group interval and an intra-group interval are D. The communication apparatus 1100 may first determine a horizontal angle $\theta$ and a vertical angle $\beta$ of a beam to be transmitted. In this case, signals transmitted from two adjacent columns of antenna elements have a path difference $D \cos \beta \cos \theta$ and a phase difference $2\pi(D/\lambda)\cos \beta \cos \theta$ in the second direction. Therefore, in a case where the 1st column of antenna elements are used as the reference set of antenna elements, the communication apparatus 1100 may determine to perform compensation of a phase $2\pi(m-1)(D/\lambda)\cos \beta \cos \theta$ on an offset antenna element of a m th column of antenna elements. Then, the communication apparatus 1100 may use the reference set of antenna elements as well as the offset antenna element after phase compensation as an equivalent set of antenna elements to transmit the beam with the horizontal angle $\theta$ and the vertical angle $\beta$, e.g., a beam-formed reference signal.

By changing the vertical angle $\beta$, the communication apparatus 1100 may transmit multiple beams with different angles with respect to the vertical direction. In a case where one antenna element is connected to multiple radio frequency links, the multiple beams may be transmitted simultaneously. In a case where one antenna element is connected to one radio frequency link, the multiple beams may be transmitted at different times.

In an embodiment of the present disclosure, since the communication apparatus 1100 uses the equivalent set of antenna elements which have more antenna elements than the reference set of antenna elements to transmit the beams when it transmits the beams, the beams have narrower width and higher gain, so that they can aim at the target communication apparatus better, and provide higher communication quality.

When the communication apparatus 1200 receives multiple beams transmitted from the communication apparatus 1100, the communication apparatus 1200 may estimate reception quality of these beams, and feed back beam indication to the communication apparatus 1100. The beam indication may include a state of reception of the multiple beams by the communication apparatus 1200. For example, the beam indication may include one or more of the following items: indication of the optimal beam (having the best reception quality) (e.g., CSI-RS Resource Indicator, i.e. CRI), reception quality of the optimal beam (e.g., CQI), channel direction of the optimal beam (e.g., PMI), as well as indication of channel states of one or more other beams. In step 6200, the communication apparatus 1100 may receive the above mentioned beam indication from the communication apparatus 1200. In step 6300, the communication apparatus 1100 may determine the channel state in the first direction of the communication apparatus 1100 and the communication apparatus 1200 based on the beam indication. For example, the communication apparatus 1100 may determine the direction of the communication apparatus 1200, i.e. the direction of the optimal beam, based on indication of the optimal beam.

Figure 7:
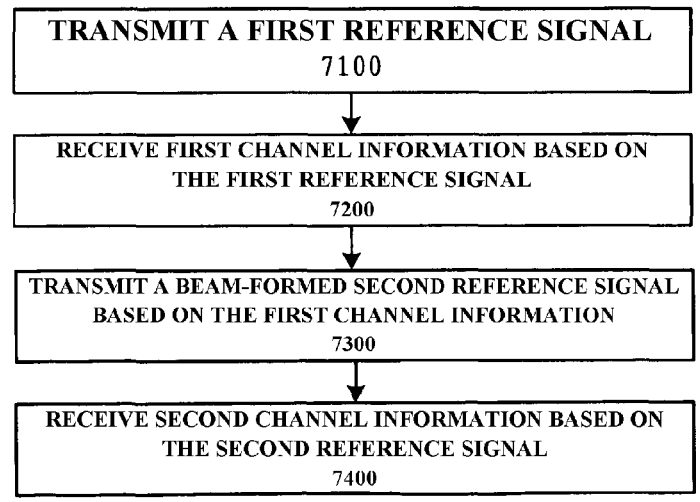
FIG. 7 illustrates a process flow of a communication apparatus acquiring a state of a downlink channel to a target communication apparatus according to an embodiment of the present disclosure.

In some embodiments, the communication apparatus 1100 may obtain the state of the downlink channel to the target communication apparatus by transmitting reference signals twice at the downlink channel estimation and feedback stages. FIG. 7 illustrates a process flow of a communication apparatus 1100 acquiring a state of a downlink channel to a target communication apparatus according to an embodiment of the present disclosure.

In step 7100, the communication apparatus 1100 may transmit a first reference signal not subject to beam-forming, e.g. CSI-RS not subject to beam-forming. In step 7200, the communication apparatus 1100 may receive first channel information from the communication apparatus 1200. The first channel information may be information about the state of the downlink channel from the communication apparatus 1100 to the communication apparatus 1200, which is acquired by the communication apparatus 1200 based on the first reference signal. For example, the first channel information may be indication of a codeword selected from the offset codebook for the antenna 1120 by the communication apparatus 1200, e.g. PMI.

In step 7300, the communication apparatus 1100 may transmit a beam-formed second reference signal, e.g. beam-formed CSI-RS, based on the first channel information. For example, the communication apparatus 1100 may determine the direction of the communication apparatus 1200 based on the first channel information, then transmit a beam-formed second reference signal aiming at the direction. Spatial processing parameters (e.g., a combination coefficient of a radio frequency circuit and an antenna in baseband beam-forming, a phase, an amplitude of an antenna in analog beam-forming, etc) for performing beam-forming on the second reference signal may be determined based on the direction.

In step 7400, the communication apparatus 1100 may receive second channel information from the communication apparatus 1200. The second channel information may be acquired by the communication apparatus 1200 based on the beam-formed second reference signal. In comparison with the first channel information, the second channel information can reflect the state of the downlink channel from the communication apparatus 1100 to the communication apparatus 1200 more accurately.

In some embodiments, the beam-formed second reference signal may be transmitted by the reference set of antenna elements and at least one offset antenna element of the antenna 1120, so that it is possible to reduce beam width and improve beam gain, so that the transmission effect of the beam-formed reference signal is improved. When the communication apparatus 1200 receives the beam-formed second reference signal transmitted by using the reference set of antenna elements and the at least one offset antenna element, it may estimate and obtain the state of the channel in the first direction (e.g., CQI, PMI, etc), and feed back the second channel information including the state of the channel in the first direction to the communication apparatus 1100. When the communication apparatus 1100 receives the second channel information, it may estimate a state of a channel in the second direction based on the state of the channel in the first direction included in the second channel information as well as the first channel information. For example, the communication apparatus 1100 may use formulas 7-9 to estimate the state of the channel in the second direction.

In some embodiments, the beam-formed second reference signal may be transmitted by the reference set of antenna elements, at least one offset antenna element, as well as a set of antenna elements aligned in the second direction, of the antenna 1120. The offset array antenna in FIG. 4B is taken as an example. A longitudinal broken line ellipse in FIG. 4B denotes a combination of the reference set of antenna elements and the pseudo antenna elements, a lateral solid line ellipse denotes a set of actual antenna elements aligned in the second direction (the number thereof is the same as the number of sets of the antenna elements of the offset array antenna). The communication apparatus 1100 may use antenna elements in the broken line ellipse to perform beam-forming in the first direction, use antenna elements in the solid line ellipse to perform beam-forming in the second direction. Thereby, the communication apparatus 1200 may acquire the states of channels in the first direction and the second direction based on the second reference signal subject to beam-forming in the first direction and in the second direction, and feed back the second channel information including the states of channels in the first direction and the second direction to the communication apparatus 1100. In addition, the communication apparatus 1100 may also use the offset array antenna FIG. 4C, so that it uses a combination of actual antenna elements and pseudo antenna elements to perform beam-forming in both the first direction and the second direction. For example, in FIG. 4C, beam-forming in the second direction may be accomplished by using the lowermost 1 actual antenna element in the 1st column, an antenna element in the 2nd column which is aligned with the actual antenna element in the second direction, as well as the uppermost antenna elements in the 3rd, 4nd columns (subject to vertical phase compensation).

It is noted that, using the pseudo antenna element to transmit/receive a signal or perform beam-forming, mentioned herein, in fact refers to transmitting/receiving a signal or performing beam-forming after performing phase compensation on the offset antenna element corresponding to the pseudo antenna element.

Hereinabove, the process flow of acquiring the state of the downlink channel from the communication apparatus 1100 to the communication apparatus 1200 is described. In some embodiments, by receiving the reference signal from the communication apparatus 1200, the communication apparatus 1100 may also obtain the state of the uplink channel from the communication apparatus 1200 to the communication apparatus 1100 based on the reference signal. In an example in which uplink and downlink channels have reciprocity, e.g. a TDD system, the base station may determine one of the state of the uplink channel and the state of the downlink channel, and determine the beam used by downlink transmission according to the state of the channel.

Hereinafter, a process flow of acquiring the state of the uplink channel from the communication apparatus 1200 to the communication apparatus 1100 will be described.

The communication apparatus 1100 may acquire a joint channel coefficient vector for the reference set of antenna elements and at least one offset antenna element. The joint channel coefficient vector includes channel coefficients for the reference set of antenna elements and a channel coefficient for the at least one offset antenna element subject to a compensation. Then, the communication apparatus 1100 may acquire the channel state in the first direction based on the joint channel coefficient vector.

For example, by the communication apparatus 1100 performing phase compensation on the at least one offset antenna element in the second direction, there is no phase difference in the second direction between the compensated at least one antenna element and the reference set of antenna elements.

In addition, the compensation may be performed based on initial channel coefficients for the offset array antennas, and the initial channel coefficients may be acquired by a channel state estimation method for a non-offset array antenna.

Figure 8:
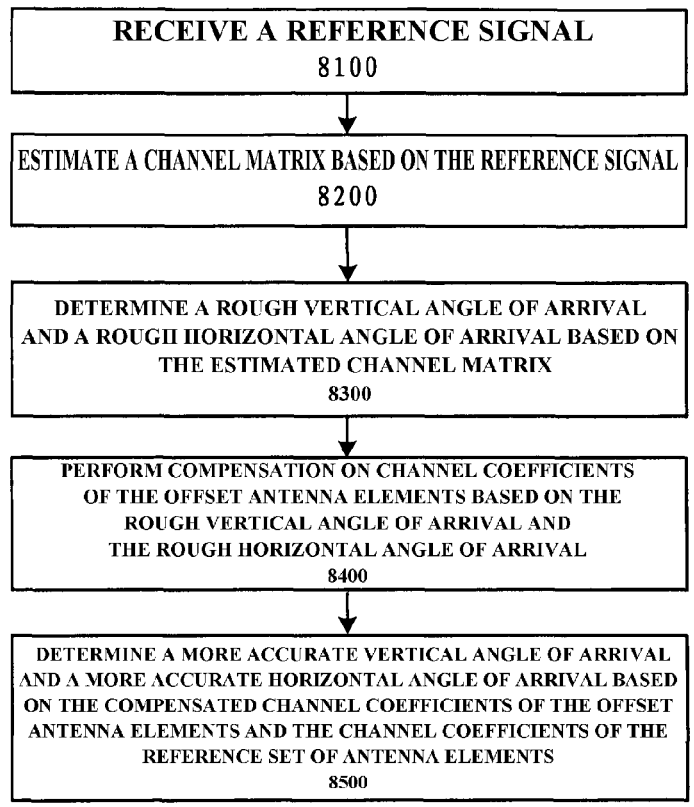
FIG. 8 illustrates a process flow of a communication apparatus acquiring a state of an uplink channel from a target communication apparatus to the communication apparatus according to an embodiment of the present disclosure.

FIG. 8 illustrates a process flow of a communication apparatus 1100 acquiring a state of an uplink channel from a target communication apparatus to the communication apparatus 1100 according to an embodiment of the present disclosure. Hereinafter, the antenna 1120 being the offset array antenna 3000 in FIG. 3 is taken as an example to explain the process flow, and it is assumed that the offset array antenna 3000 is a vertical offset array antenna (e.g., the vertical offset array antenna 2200). However, when the antenna 1120 is another type of offset array antenna (e.g., the horizontal offset array antenna 2300), the process flow may be slightly modified.

In step 8100, the communication apparatus 1100 may receive the reference signal from the communication apparatus 1200. In step 8200, the communication apparatus 1100 may use the channel state estimation method of the non-offset array antenna to estimate initial channel coefficients, i.e. a channel matrix $\hat{G} \in C^{M \times M}$, based on the received reference signal. The channel matrix $\hat{G}$ may be expressed as follows:

$$\hat{G} = h^e(\beta) \otimes (h^{a,\text{offset}}(\beta, \theta))^T, \quad \text{(formula 12)}$$

where $h^e(\beta)$ and $h^{a,\text{offset}}(\beta, \theta)$ denote a vertical direction channel steering vector and a horizontal direction channel steering vector respectively with E-AoA being $\beta$, A-AoA being $\theta$. An element at a m th row and a n th column in the channel matrix $\hat{G}$ corresponds to a m th antenna element of a n th column of antenna elements of the vertical offset array antenna, a n th antenna element of a m th row of antenna elements of the horizontal offset array antenna.

In step 8300, the communication apparatus 1100 may determine a rough vertical angle of arrival and a rough horizontal angle of arrival based on the estimated channel matrix $\hat{G}$. For example, the communication apparatus 1100 may use the above mentioned location-based angle of arrival estimation algorithm, ESPRIT or MUSIC algorithms, etc, to determine the rough vertical angle of arrival $\hat{\beta}_0$ and the rough horizontal angle of arrival $\hat{\theta}_0$.

For example, if the location-based angle of arrival estimation algorithm is adopted, the following process may be performed. $g_e$ is recorded as a first column (may also be any another column) of $\hat{G}$, it denotes channel estimation results of the 1st column of respective antenna elements of the offset array antenna 3000. Rough estimation $\hat{\beta}_0$ of E-AoA may be calculated as follows:

$$\tilde{g}_e = F_M g_e, \quad \text{(formula 13)}$$

$$n_{e,0} = \arg \max_{0 \leq n \leq M-1} |\tilde{g}_e|, \quad \text{(formula 14)}$$

$$\hat{\beta}_0 = \arcsin \frac{\lambda}{D}\left(1 - \frac{n_{e,0}}{M}\right), \quad \text{(formula 15)}$$

where $\tilde{g}_e$ is a vertical direction steering vector in an angle domain, $n_{e,0}$ is a largest amplitude location index, $F_M$ is a M th order DFT matrix. Then, it is possible to, according to $\hat{\beta}_0$, compute a rough estimation value $\hat{\theta}_0$ of A-AoA as follows:

$$\tilde{g}_a = F_M g_a, \quad \text{(formula 16)}$$

$$n_{a,0} = \arg \max_{0 \leq n \leq M-1} |\tilde{g}_a|, \quad \text{(formula 17)}$$

$$\hat{\theta}_0 = \begin{cases} \arccos \dfrac{\lambda}{D \cos \hat{\beta}_0}\left(1 - \dfrac{n_{a,0}}{M}\right), & n_{a,0} \geq M/2 \\ \arccos -\dfrac{n_{a,0}}{M} \dfrac{\lambda}{D \cos \hat{\beta}_0}, & n_{a,0} < M/2 \end{cases}, \quad \text{(formula 18)}$$

where $g_a$ denote channel coefficients of a set of antenna elements aligned in the horizontal direction, $\tilde{g}_a$ is a horizontal direction steering vector in the angle domain, $n_{a,0}$ is the largest amplitude location index. It is noted that since there are phase differences in the vertical direction between respective columns of antenna elements of the vertical offset array antenna, $g_a$ is not the first row of $\hat{G}$, but the minor diagonal of $\hat{G}$.

In step 8400, the communication apparatus 1100 may perform compensation on channel coefficients of the offset antenna elements based on the rough vertical angle of arrival and the rough horizontal angle of arrival. In a case where the 1st column of antenna elements are used as the reference set of antenna elements, the communication apparatus 1100 may determine an initial channel coefficient of an offset antenna element of a m th column of antenna elements to be multiplied by $$e^{-j2\pi(M-1)\frac{D}{\lambda}\cos\hat{\beta}_0 \cos\hat{\theta}_0}.$$

I.e. it performs compensation of a phase $2\pi(m-1)(D/\lambda)\cos\hat{\beta}_0 \cos\hat{\theta}_0$ on the offset antenna element of the m th column of antenna elements, to eliminate the horizontal phase difference between the offset antenna element and the reference set of antenna elements. The compensated channel coefficients of the offset antenna elements denote the channel coefficients of the pseudo antenna elements corresponding to the offset antenna elements.

In step 8500, the communication apparatus 1100 may determine a more accurate vertical angle of arrival and a more accurate horizontal angle of arrival based on the compensated channel coefficients of the offset antenna elements and the channel coefficients of the reference set of antenna elements.

Recording $g_r \in C^{1 \times M}$ as a M th row of $\hat{G}$, a 2nd to a M th elements of the vector denote channel coefficients of offset antenna elements of a 2nd to a M th columns of antenna elements. It is possible to generate a compensation matrix $C \in C^{M \times M}$ for offset antenna elements of the 2nd to the M th columns of antenna elements, the compensation matrix may be expressed as $$C = \begin{pmatrix} 1 & \cdots & 0 \\ \vdots & \ddots & \vdots \\ 0 & \cdots & e^{-j2\pi(M-1)\frac{D}{\lambda}\cos\hat{\beta}_0 \cos\hat{\theta}_0} \end{pmatrix}. \quad \text{(formula 19)}$$

Using $g_r$ and the compensation matrix C, a channel vector $g_v \in C^{(M-1) \times 1}$ of the pseudo antenna elements may be obtained as follows $$g_v = \langle Cg_r^H \rangle_{2:M} \quad \text{(formula 20)}$$

where $\langle \cdot \rangle_{2:M}$ denotes acquiring the 2nd to the M th columns of the vector. Then, actual antenna elements and pseudo antenna elements in the 1st column are used to generate a vertical direction joint channel vector $g_j \in C^{(2M-1) \times 1}$ as follows $$g_j = [g_e, g_v]. \quad \text{(formula 21)}$$

Using the joint vector $g_j$, it is possible to estimate E-AoA more accurately, obtain a more accurate vertical angle of arrival $\hat{\beta}$ as follows:

$$\tilde{g}_j = F_{2M-1} g_j, \quad \text{(formula 22)}$$

$$n_e = \arg\max_{0 \le n \le 2M-1} |\tilde{g}_j|, \quad \text{(formula 23)}$$

$$\hat{\beta} = \arcsin \frac{\lambda}{D} \left(1 - \frac{n_e}{2M-1}\right), \quad \text{(formula 24)}$$

where $F_{2M-1}$ is a $2M-1th$ order $DFY$ matrix.

In addition, it is possible to substitute $\hat{\beta}$ for $\hat{\beta}_0$ in formula 18 to compute a more accurate horizontal angle of arrival $\hat{\theta}$.

The above mentioned process flow may obtain the more accurate vertical angle of arrival and the more accurate horizontal angle of arrival, so that when downlink beamforming is performed e.g. in a TDD system, beam direction can aim at a target user more accurately, improve beamforming performance.

In some embodiments, the communication apparatus 1100 may determine an offset codebook for performing beamforming on the antenna 1120 being the offset array antenna based on the phase difference in the first direction. The method of determining the offset codebook has been already described above, description thereof is no longer repeated herein.

The communication apparatus 1100 may transmit offset information of the antenna 1120 being the offset array antenna to the communication apparatus 1200, e.g. in the process of access of the communication apparatus 1200. The offset information may include e.g. offset direction of the antenna 1120 (e.g., horizontal or vertical), inter-group offset (e.g., 0 denotes no offset, 1 denotes that the inter-group offset is equal to the intra-group gap, 2 denotes that the inter-group offset is 2 times of the intra-group gap), antenna scale (e.g., the number of antenna elements in the horizontal and/or vertical direction), etc. The offset information may indicate offset modes of the antenna. The antenna 1120 may have some preset offset modes, e.g., no offset (e.g., the conventional planar array antenna), vertical-1 offset (the inter-group offset in the vertical direction is the intra-group gap), vertical-2 offset (the inter-group offset in the vertical direction is 2 times of the intra-group gap), horizontal-1 offset (the inter-group offset in the horizontal direction is the intra-group gap), horizontal-2 offset (the inter-group offset in the horizontal direction is 2 times of the intra-group gap), etc. The communication apparatus 1100 may number these preset modes, then include the number of the offset mode to be used in the offset information and transmit the offset information to the apparatus 1200.

In some embodiments, the arrangement method of antenna elements on a panel which supports the offset antenna array may vary in various preset offset modes (the offset direction and the offset of antenna elements are adjusted manually or electrically by a common mechanical structure such as a movable connection member, etc). The operator may fix an offset mode manually according to a deployment scene. Instead, the communication apparatus 1100 may dynamically adjust the offset mode to be used, according to uplink/downlink channel states. For example, the communication apparatus 1100 may adjust the inter-group offset, i.e. the spatial offset in the first direction between multiple sets of antenna elements, e.g., from the "vertical-1 offset" mode to the "vertical-2 offset". It may be understood that, since it is not necessary to add extra antenna elements and only more complex mechanical structure support is needed, under teaching of the present inventor, this is simply routine mechanical design work.

[3-2. Process in Communication Apparatus 1200]

The communication apparatus 1200 may receive a signal from the communication apparatus 1100 or transmit a signal to the communication apparatus 1100 via the antenna 1220. The antenna 1120 of the communication apparatus 1100 may be the offset array antenna as described above. Therefore, signals transmitted from the communication apparatus 1100 using the antenna 1120, which are received by the communication apparatus 1200, have phase differences in the first direction. The communication apparatus 1200 may use the signals to obtain the state of the channel in the first direction between the communication apparatus 1100 and the communication apparatus 1200, then transmit information including indication of the state of the channel in the first direction to the communication apparatus 1100 as the target communication apparatus.

The signals received by the communication apparatus 1200 may be transmitted using the reference set of antenna elements and at least one offset antenna element of the antenna 1120 of the communication apparatus 1100 at the downlink beam training stage and/or the downlink channel estimation and feedback stage, e.g. beam-formed CSI-RS. In the case of using the reference set of antenna elements and the at least one offset antenna element of the antenna 1120 to transmit beam-formed signals, beams of the signals may have narrower width and higher gain, so that it is possible to estimate the channel state more accurately in the communication apparatus 1200.

Hereinafter, a process flow of the communication apparatus 1200 will be specifically described with reference to FIGS. 9-10. In the following description, some specific flows operations performed by the communication apparatus 1100 have been already described above in detail with reference to the communication apparatus 1100, description thereof is no longer repeated herein.

Figure 9:
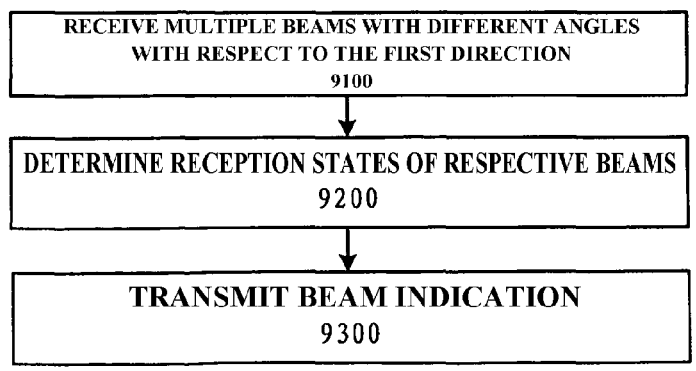
FIG. 9 illustrates a process flow of a communication apparatus at a downlink beam training stage according to an embodiment of the present disclosure.

FIG. 9 illustrates a process flow of a communication apparatus 1200 at a downlink beam training stage according to an embodiment of the present disclosure.

In step 9100, the communication apparatus 1200 may receive multiple beams with different angles with respect to the first direction, which are transmitted from the communication apparatus 1100 using the reference set of antenna elements and the at least one offset antenna element of the antenna 1120. For example, the communication apparatus 1200 may use dedicated reference signal resources (transmission resources) to transmit beam-formed reference signals at different angles with respect to the first direction.

In step 9200, the communication apparatus 1200 may determine reception states of these beams. For example, it estimates the reception quality of these beams.

In step 9300, the communication apparatus 1200 may transmit beam indication to the communication apparatus 1100, e.g., indication of reception states (e.g., reception quality (e.g. CQI, RSSI)) of multiple beams. In some embodiments, the beam indication may be indication of a beam of the multiple beams with a best reception quality. For example, the beam indication may include one or more of the following items: indication of the optimal beam (having the best reception quality) (e.g., CSI-RS Resource Indicator CRI (the communication apparatus 1100 may use different transmission resources to transmit beam-formed CSI-RSs, i.e. BF-CSI-RSs, in different directions, the communication apparatus 1200 feeds back the CRI to indicate the beams)), reception quality of the optimal beam (e.g., CQI), channel direction of the optimal beam (e.g., PMI), as well as indication of channel states of one or more other beams. When the communication apparatus 1100 receives beam indication, it may determine the direction of the communication apparatus 1200 and/or the optimal beam for the communication apparatus 1200 according to the beam indication.

In the above mentioned example, the message fed back to the communication apparatus 1100 by the communication apparatus 1200 may further include channel state information, e.g., PMI, RI, to improve space division gain. In addition, in some examples, indication of a number/ID of a beam is associated with a transmission resource position occupied by a corresponding feedback message, so that it is implicitly included in the feedback message, and does not necessarily correspond to a transmission bit.

Figure 10:
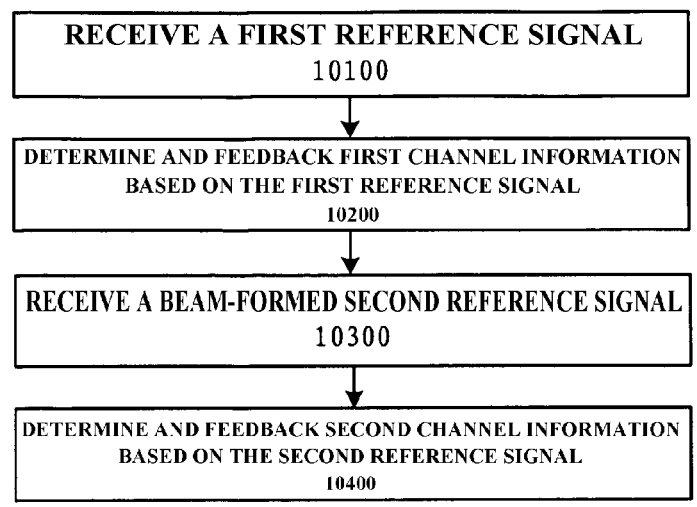
FIG. 10 illustrates a process flow of a communication apparatus at a downlink channel estimation and feedback stage according to an embodiment of the present disclosure.

FIG. 10 illustrates a process flow of a communication apparatus 1200 at a downlink channel estimation and feedback stage according to an embodiment of the present disclosure.

In step 10100, the communication apparatus 1200 may receive a first reference signal, e.g. a conventional CSI-RS not subject to beam-forming.

In step 10200, the communication apparatus 1200 may determine and feedback first channel information based on the first reference signal. For example, the communication apparatus 1200 may estimate the downlink channel from the communication apparatus 1100 to the communication apparatus 1200 based on the first reference signal, select the optimum codeword from the offset codebook for the antenna 1120, e.g., the codeword matching the estimation result of the downlink channel, according to the estimation result of the downlink channel. The offset codebook may be determined by the communication apparatus 1200 based on offset information received from the communication apparatus 1100, may also be prestored in a memory at an initialization stage of the communication apparatus 1200. The communication apparatus 1200 may include indication of the matched codeword (e.g., PMI) in the first channel information which is transmitted to the communication apparatus 1100.

The above introduced offset codebooks are offset Kronecker product DFT codebooks in the first direction as well as the second direction, e.g., codebooks for quantizing the Kronecker products of the channel steering vectors in the first direction and the second direction. In addition, it is also possible to only adopt the offset codebook in the second direction. For example, the communication apparatus 1200 may quantize and store the channel steering vector in the second direction based on formula 10, as the offset codebook in the second direction. When the communication apparatus 1200 receives the first reference signal, it may estimate and obtain the state of the channel in the second direction, then compare the estimation result of the state of the channel in the second direction with the offset codebook in the second direction, determine the matched codeword in the second direction, and include indication of the matched codeword in the second direction in the first channel information which is transmitted to the communication apparatus 1100. In addition, when the communication apparatus receives the first reference signal, it may also estimate and obtain the state of the channel in the first direction, then compare the estimation result of the state of the channel in the first direction with the non-offset codebook in the first direction (a codebook obtained by quantizing formula 2), determine the matched codeword in the first direction, and include indication of the matched codeword in the first direction in the first channel information which is transmitted to the communication apparatus 1100.

In step 10300, the communication apparatus 1200 may receive the beam-formed second reference signal. In step 10400, the communication apparatus 1200 may determine and feedback second channel information based on the second reference signal.

In some embodiments, the second reference signal may be transmitted by the communication apparatus 1100 using the reference set of antenna elements and the at least one offset antenna element of the antenna 1120 to perform beam-forming in the first direction. When the communication apparatus 1200 receives the second reference signal which is beam-formed in the first direction and transmitted by the reference set of antenna elements and the at least one offset antenna element, it may estimate and obtain the state of the channel in the first direction (e.g., CQI, PMI), and feed back the second channel information including the state of the channel in the first direction to the communication apparatus 1100.

In some embodiments, the second reference signal may be transmitted by the reference set of antenna elements, at least one offset antenna element, as well as a set of antenna elements aligned in the second direction, of the antenna 1120 performing beam-forming in the first direction and the second direction. The communication apparatus 1200 may acquire the states of channels in the first direction and the second direction based on the second reference signal subject to beam-forming in the first direction and in the second direction (e.g., CQI, PMI), and feed back the second channel information including the states of channels in the first direction and the second direction to the communication apparatus 1100.

[3-3. Some Special Processing for an Array Antenna Having Absent or Damaged Antenna Elements]

There are some differences between an array antenna having absent or damaged antenna elements and an offset array antenna. This is because, with respect to the array antenna having absent or damaged antenna elements, actual antenna elements which can work normally should originally exist in locations of the absent or damaged antenna elements. But it is possible that antenna elements at the locations are damaged or absent due to some unexpected reasons, so that this may result in deterioration in communication quality of the array antenna. Therefore, with respect to the array antenna having absent or damaged antenna elements, some special processing may be executed to improve communication quality thereof. Hereinafter, in a case where it is assumed that the antenna 1120 of the communication apparatus 1100 is the antenna 3100 in FIG. 3B, explanation will be made.

Firstly, an uplink channel estimation process in the communication apparatus 1100 will be described.

When the communication apparatus 1100 receives signals from the target communication apparatus 1200 via the antenna 1120, the absent or damaged antenna elements can not normally receive the signals, thus the communication apparatus 1100 may know which antenna elements are the absent or damaged antenna elements. The communication apparatus 1100 may first obtain the inter-group phase difference in the second direction of the antenna 1120 based on signals received from normal antenna elements, e.g., may obtain the inter-group phase difference based on signals received from a 2nd antenna element in the 1st column and a 2nd antenna element in the 2nd column in FIG. 3B. After obtaining the inter-group phase difference, the communication apparatus 1100 may perform phase compensation in the second direction on the offset antenna elements, e.g., perform compensation of 1 time of the inter-group phase difference on the offset antenna element in the 2nd column, perform compensation of 2 times of the inter-group phase difference on the offset antenna element in the 3rd column. Then, the communication apparatus 1100 may use the offset antenna elements subject to phase compensation and the reference set of antenna elements to estimate the channel state in the first direction.

Secondly, similar to the example of the offset array antenna, the communication apparatus 1100 may use the reference set of antenna elements and the offset antenna elements to perform the downlink beam training.

Finally, in the downlink channel estimation and feedback process, the communication apparatus 1200 may determine which antenna elements are absent or damaged based on received signals. For example, in a case where the communication apparatus 1100 uses different antenna elements to transmit the reference signals in different time periods, the communication apparatus 1200 may determine whether antenna elements corresponding to the time periods are absent or damaged by judging whether it has received the signals in specific time periods.

In this example, the antenna 1120 is a 4×4 uniformly-spaced planar array antenna, the channel coefficient matrix thereof is a 4×4 matrix. However, since certain antenna elements are absent or damaged, elements corresponding to the absent or damaged antenna elements are 0 in the 4×4 channel coefficient matrix determined by the communication apparatus 1200 based on received reference signals. In this case, the communication apparatus 1200 may still use a codebook corresponding to a conventional 4×4 uniformly-spaced planar array antenna to determine a matched codeword, then feed back information indicating the matched codeword to the communication apparatus 1100. The communication apparatus 1100 may determine a rough direction of the channel based on received feedback information, then, in a method similar to the offset array antenna, use the reference set of antenna arrays and the offset antenna array to transmit beam-formed reference signals in the rough direction of the channel so as to perform more accurate estimation on the channel.

Some specific details of the processes with respect to the array antenna having absent or damaged antenna elements, described herein, have been already described above with reference to the offset array antenna, thus are no longer repeated herein.

4. SIMULATION RESULT

Consider a one-cell-multiple-user, line-of-sight channel scene, compare simulation results in a case where the communication apparatus 1100 (e.g., the base station located at the center of the cell) is configured with a conventional uniformly-spaced planar array antenna as well as simulation results in a case where the communication apparatus 1100 is configured with an offset uniformly-spaced planar array antenna in the "vertical-1 offset" mode. Numerical simulation parameters are as shown in Table 1:

TABLE 1

| Simulation System Parameters | |
|---|---|
| cell inner diameter $r_{min}$ | 50 m |
| cell outer diameter $r_{max}$ | 200 m |
| number of users K | 4, 8 |
| number of antennas M | 8, 16 |
| antenna gap D | $\lambda/2$ |
| base station height | 35 m |
| user height | 1.5 m |
| A-AoA distribution | $U(0, \pi)$ |
| E-AoA distribution | $U(\beta_{min}, \beta_{max})$ | where U represents a uniform distribution, $\beta_{min}$ and $\beta_{max}$ depend on the base station height, the user height, the cell inner diameter and the cell outer diameter.

Figure 11:
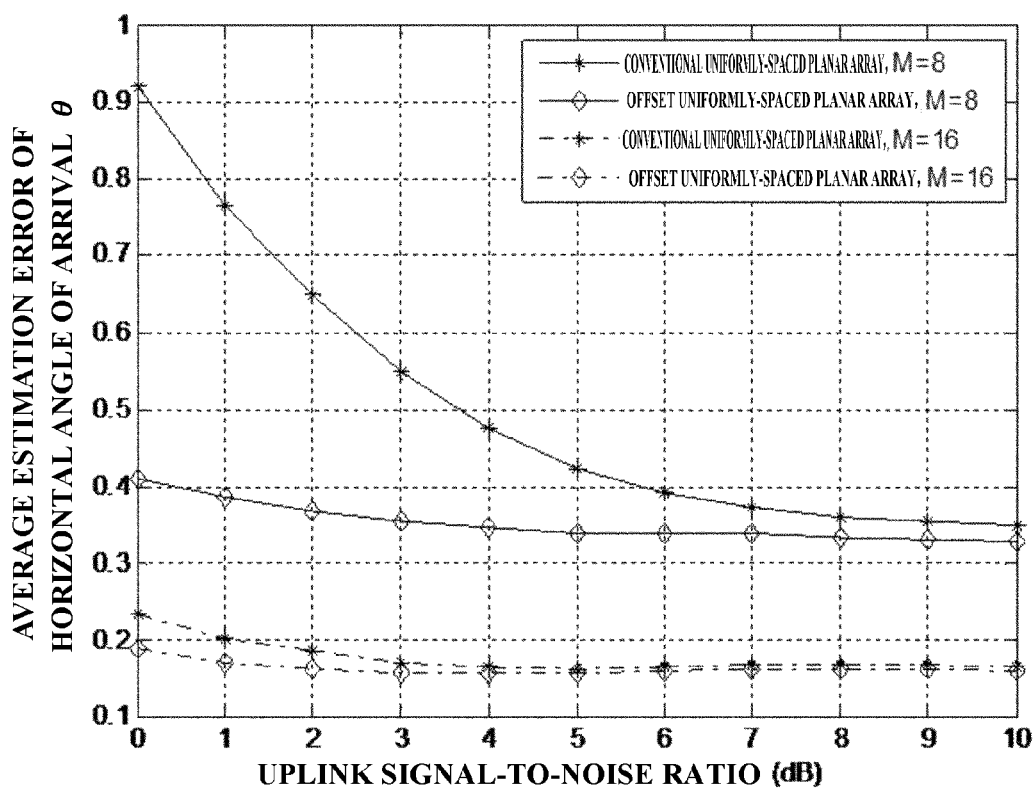
FIG. 11 illustrates estimation results of horizontal angles of arrival of a scheme of the present invention and a conventional uniformly-spaced planar array antenna.
Figure 12:
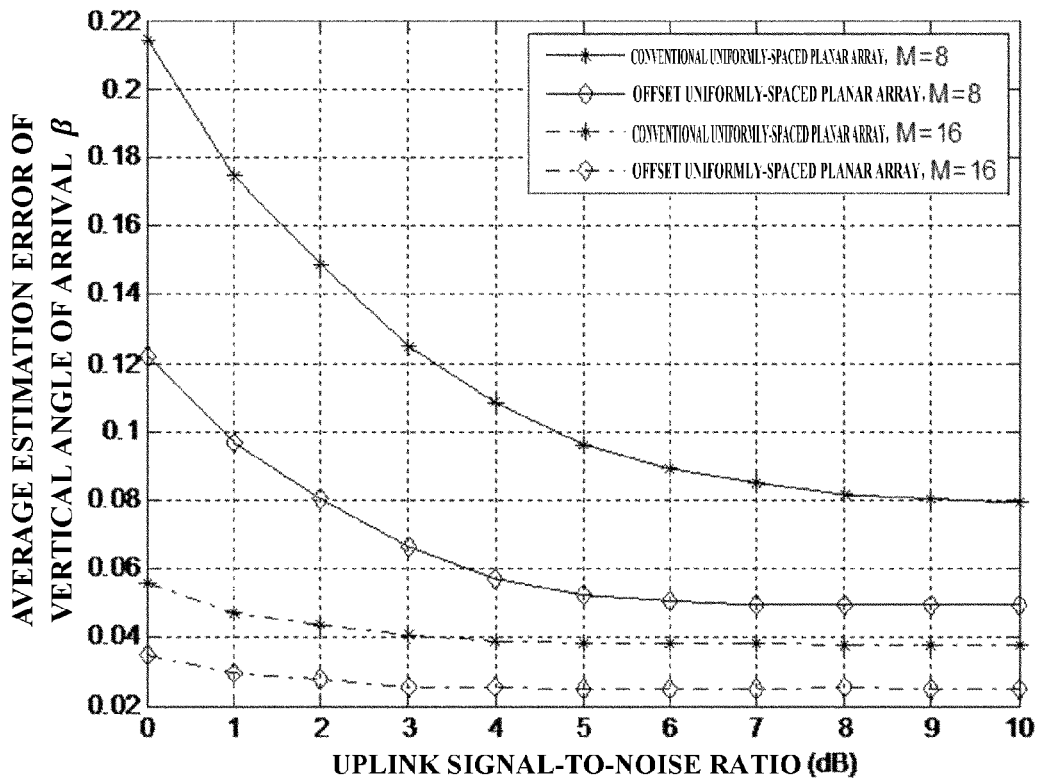
FIG. 12 illustrates estimation results of vertical angles of arrival of a scheme of the present invention and a conventional uniformly-spaced planar array antenna.

FIG. 11 illustrates estimation results of horizontal angles of arrival of a scheme of the present invention and a conventional uniformly-spaced planar array antenna. FIG. 12 illustrates estimation results of vertical angles of arrival of a scheme of the present invention and a conventional uniformly-spaced planar array antenna. As shown in FIGS. 11, 12, under the scheme of the present invention, both estimation errors of E-AoA and A-AoA are significantly reduced, especially in a low Signal-to-Noise scene. And, in comparison of E-AoA estimation performance, since the scheme of the present invention adopts the offset antenna elements in beam-forming of the vertical direction, the scheme of the present invention has very obvious performance gain effects under different Signal-to-Noise ratio scenes.

Figure 13:
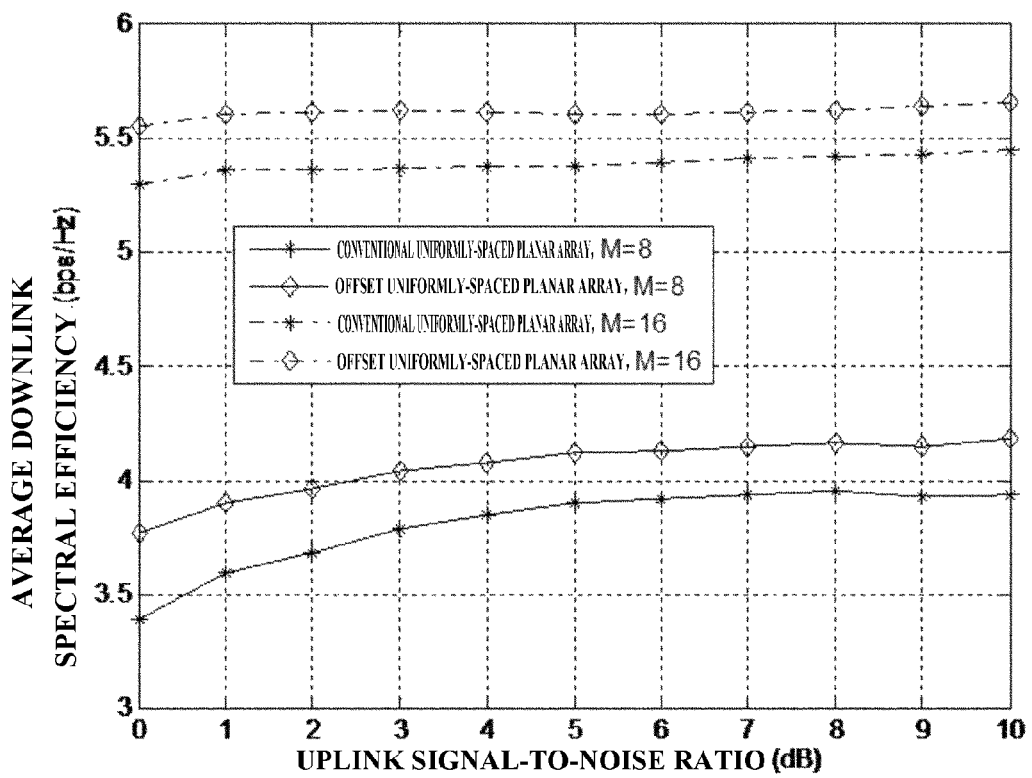
FIG. 13 illustrates downlink beam-forming spectral efficiencies of a scheme of the present invention and a conventional uniformly-spaced planar array antenna.

FIG. 13 illustrates downlink beam-forming spectral efficiencies of a scheme of the present invention and a conventional uniformly-spaced planar array antenna. It gives contrast of downlink spectral efficiencies in the case of different uplink Signal-to-Noise ratios, mainly explains influences of uplink channel estimation on the downlink beam-forming. Here, a downlink Signal-to-Noise ratio SNR=20 dB is adopted to reduce influences of noise of a receiver at the user end, interference between users after beam-forming is mainly considered. Apparently, the downlink spectral efficiency of the scheme of the present invention is higher, this is because, the uplink channel estimation is more accurate, so that the downlink beams can aim at the target user more accurately, reduce interference between users.

Figure 14:
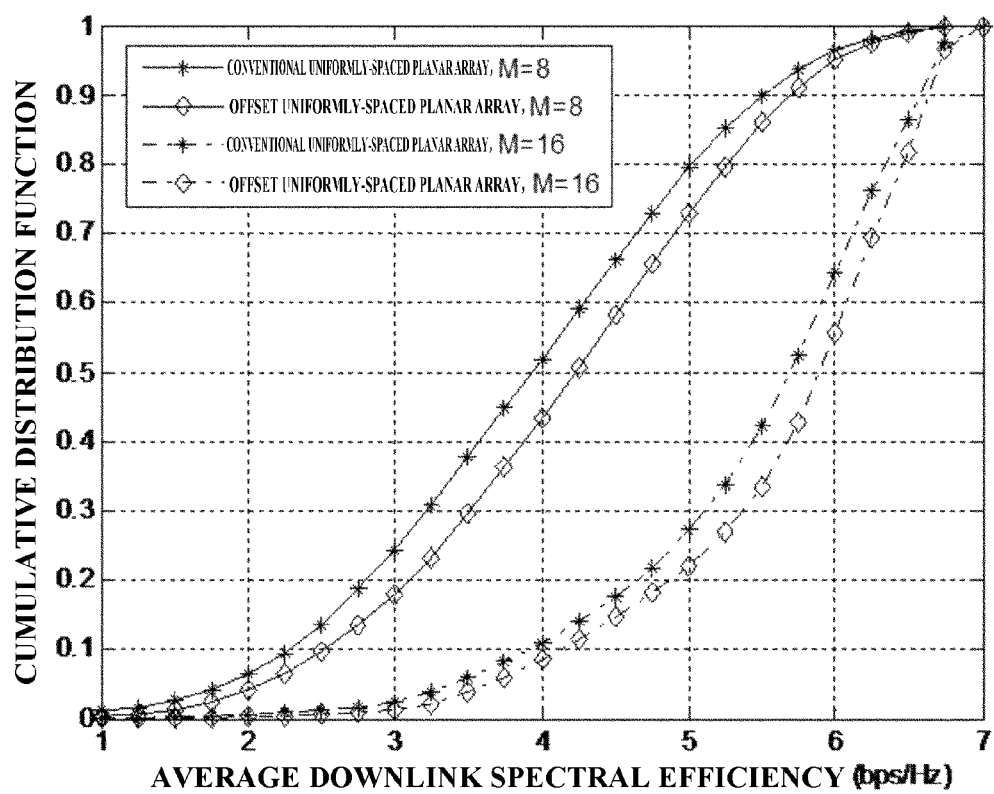
FIG. 14 illustrates a cumulative distribution function graph of user downlink average spectral efficiencies of a scheme of the present invention and a conventional uniformly-spaced planar array antenna in the same Signal-to-Noise (SNR) environment.

FIG. 14 illustrates a cumulative distribution function graph of user downlink average spectral efficiencies of a scheme of the present invention and a conventional uniformly-spaced planar array antenna in the same Signal-to-Noise (SNR) environment. In FIG. 14, both uplink and downlink Signal-to-Noise ratios are 20 dB. It may also be seen from FIG. 14 that, the user downlink average spectral efficiency of the scheme of the present invention is higher.

5. APPLICATION EXAMPLES

[5-1. Application Examples Regarding a Communication Apparatus 1100]

First Application Example

Figure 15:
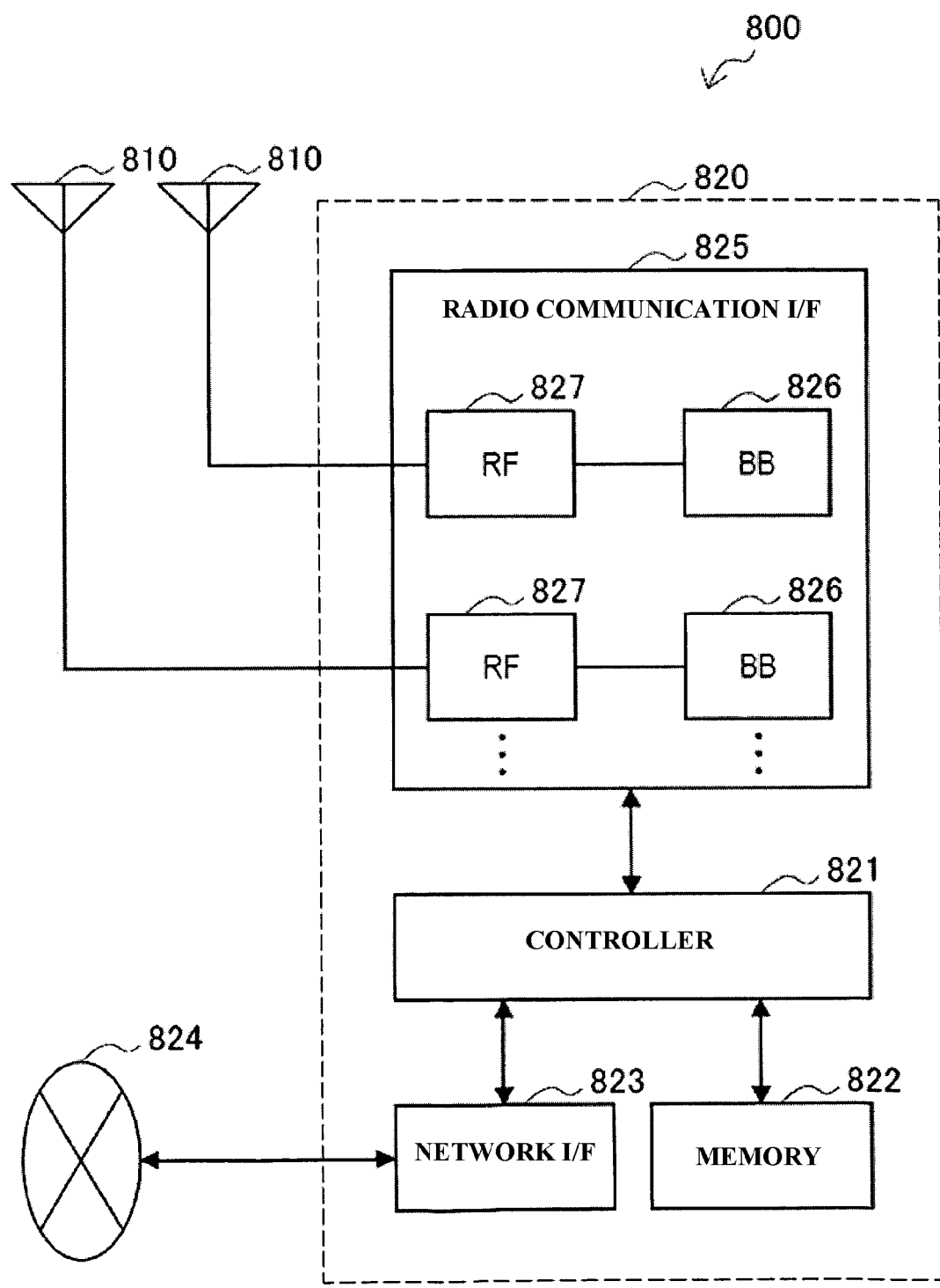
FIG. 15 is a block diagram illustrating a first example of a schematic configuration of an eNB.

FIG. 15 is a block diagram illustrating a first example of a schematic configuration of an eNB to which the technology of the present disclosure may be applied. An eNB 800 includes a plurality of antennas 810 as well as a base station device 820. The base station device 820 and each antenna 810 may be connected to each other via an RF cable.

Each of the antennas 810 includes a single or multiple antenna elements (such as multiple antenna elements included in an multiple input multiple output (MIMO) antenna), and is used for the base station device 820 to transmit and receive wireless signals. The eNB 800 may include the multiple antennas 810, as illustrated in FIG. 15. For example, the multiple antennas 810 may be compatible with multiple frequency bands used by the eNB 800. The multiple antennas 810 are arranged as the antenna array in the above mentioned example of the present disclosure, e.g. the offset array antenna.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 15. For example, the multiple BB processors 826 may be compatible with multiple frequency bands used by the eNB 800. The wireless communication interface 825 may include the multiple RF circuits 827, as illustrated in FIG. 15. For example, the multiple RF circuits 827 may be compatible with multiple antenna elements. Although FIG. 15 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 16:
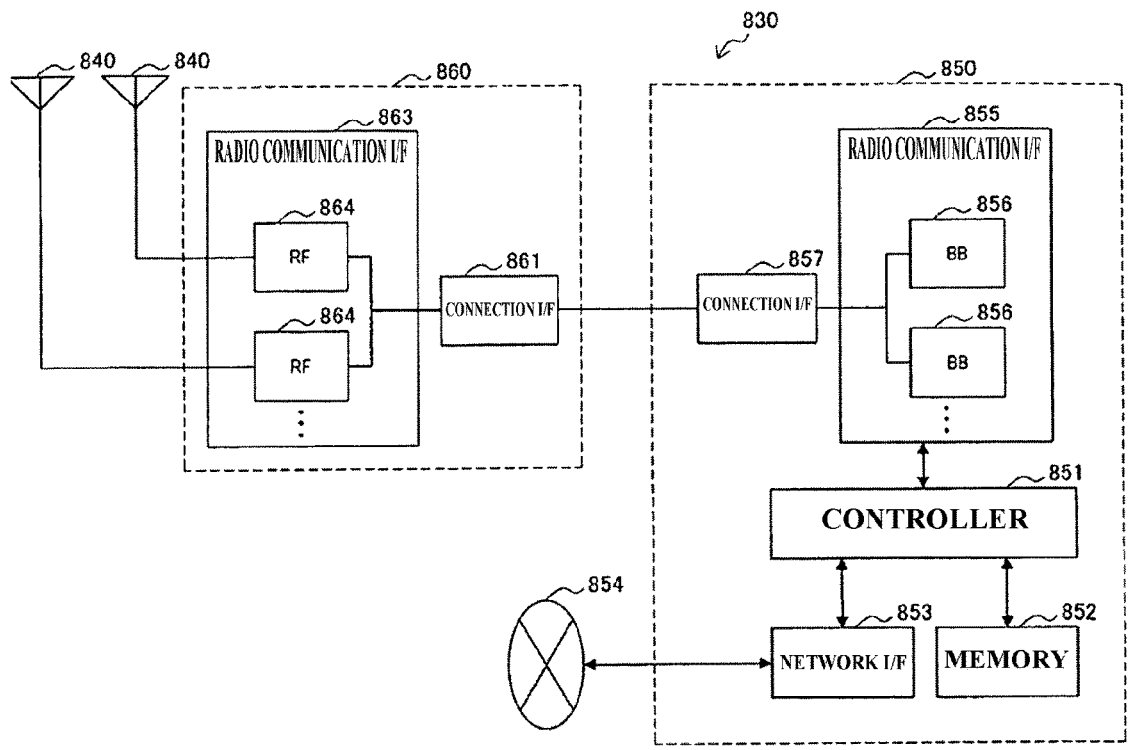
FIG. 16 is a block diagram illustrating a second example of a schematic configuration of an eNB.

FIG. 16 is a block diagram illustrating a second example of a schematic configuration of an eNB to which the technology of the present disclosure may be applied. An eNB 830 includes a plurality of antennas 840, a base station device 850 and RRH 860. The RRH 860 and each antenna 840 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna) and is used for the RRH 860 to transmit and receive wireless signals. The eNB 830 may include the multiple antennas 840, as illustrated in FIG. 16. For example, the multiple antennas 840 may be compatible with multiple frequency bands used by the eNB 830. The multiple antennas 840 are arranged as the antenna array in the above mentioned example of the present disclosure, e.g. the offset array antenna.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 15.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 15, except the BB processor 856 is connected to the RF circuit 864 of the RRH 860 via the connection interface 857. The wireless communication interface 855 may include the multiple BB processors 856, as illustrated in FIG. 16. For example, the multiple BB processors 856 may be compatible with multiple frequency bands used by the eNB 830. Although FIG. 16 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 16. For example, the multiple RF circuits 864 may support multiple antenna elements. Although FIG. 16 illustrates the example in which the wireless communication interface 863 includes the multiple RF circuits 864, the wireless communication interface 863 may also include a single RF circuit 864.

In the eNBs 800 and 830 shown in FIGS. 15 and 16, the processing circuitry 4112 described by using FIG. 1 may be implemented by the wireless communication interface 825 as well as the wireless communication interface 855 and/or the wireless communication interface 863. At least a part of functions may also be implemented by the controller 821 and the controller 851.

[5-2. Application Examples Regarding a Communication Apparatus 1200]

First Application Example

Figure 17:
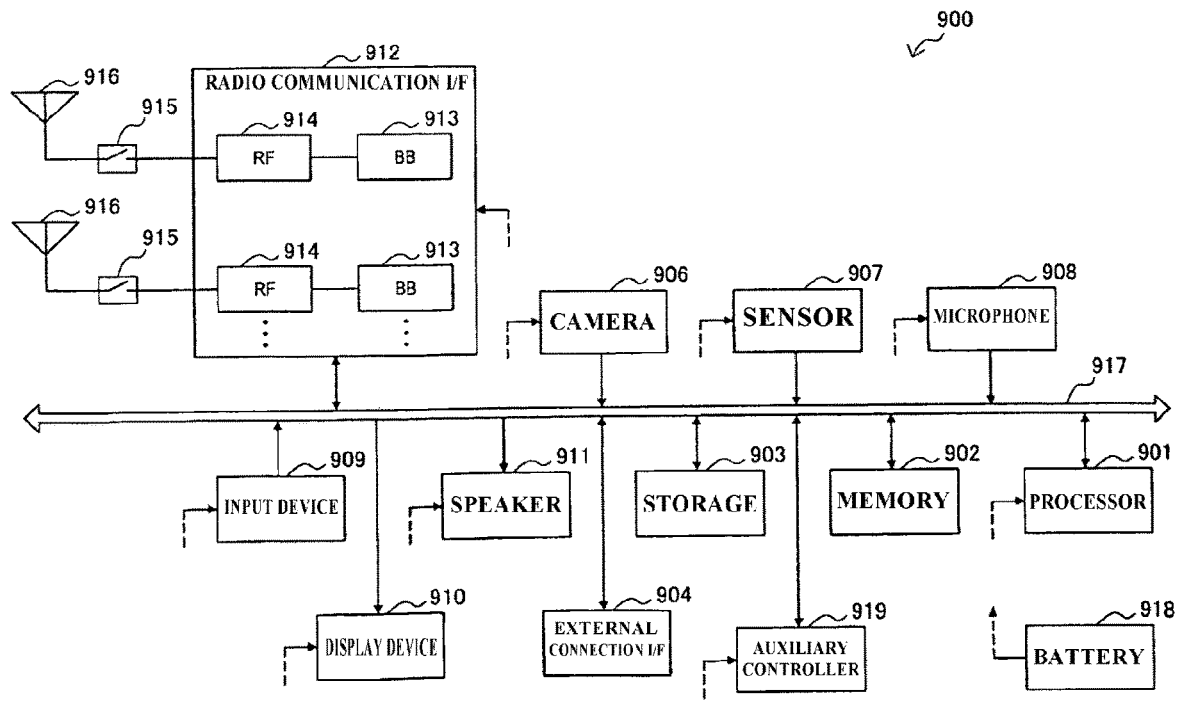
FIG. 17 is a block diagram illustrating an example of a schematic configuration of a smartphone.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may be a one chip module that has the BB processor 913 and the RF circuit 914 integrated thereon. The wireless communication interface 912 may include the multiple BB processors 913 and the multiple RF circuits 914, as illustrated in FIG. 17. Although FIG. 17 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as illustrated in FIG. 17. Although FIG. 17 illustrates the example in which the smartphone 900 includes the multiple antennas 916, the smartphone 900 may also include a single antenna 916. Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

In the smartphone 900 shown in FIG. 17, the processing circuitry 4212 described by using FIG. 1 may be implemented by the wireless communication interface 912. At least a part of functions may also be implemented by the processor 901 or the auxiliary controller 919.

Second Application Example

Figure 18:
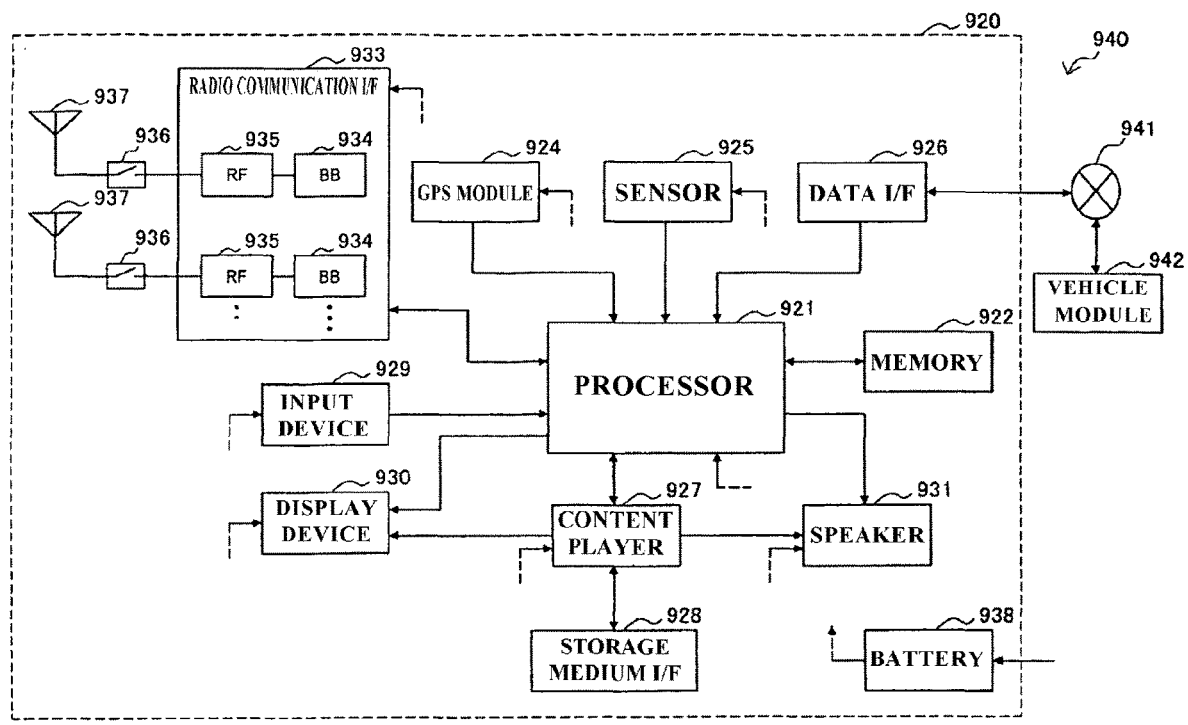
FIG. 18 is a block diagram illustrating an example of a schematic configuration of a car navigation apparatus.

FIG. 18 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and a program that is executed by the processor 921.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may also be a one chip module having the BB processor 934 and the RF circuit 935 integrated thereon. The wireless communication interface 933 may include the multiple BB processors 934 and the multiple RF circuits 935, as illustrated in FIG. 18. Although FIG. 18 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive wireless signals. The car navigation device 920 may include the multiple antennas 937, as illustrated in FIG. 18. Although FIG. 18 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 18 via feeder lines that are partially shown as dashed lines in the figure. The battery 938 accumulates power supplied from the vehicle.

In the car navigation device 920 shown in FIG. 18, the processing circuitry 4212 described by using FIG. 1 may be implemented by the wireless communication interface 933. At least a part of functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

6. CONCLUSION

A device in a communication system and a corresponding communication processing method according to one or more embodiments of the present invention are described above.

In addition, orders of process flows and method flows described herein are not limited to orders described in the specification and the drawings. The orders of some steps and flows may be exchanged, or they may be performed in parallel.

The detailed specification set forth above in conjunction with the drawings describes examples, and they do not represent the only possible examples, and neither represent the only examples within the scope of claims. When used in this specification, words "example" and "exemplary" mean "serving as an example, instance or illustration", do not mean "preferred" or "advantageous over other examples". The detailed specification includes specific details to provide understanding of the technology. However, these technologies may be practiced without these specific details. In some examples, well-known structures and apparatuses are shown in block diagram form, to avoid obscuring concepts of the examples.

Any one of various different sciences and technologies may be used to represent information and signals. For example, data, instructions, commands, information, signals, bits, symbols and chips which may be cited throughout the above specification may be represented by voltages, electric currents, electromagnetic waves, magnetic fields or magnetic particles, light fields or optical particles or any combination thereof.

Various schematic blocks and components described in conjunction with the present disclosure may be implemented or executed by general-purpose processors, digit signal processors (DSPs), ASICs, FPGAs or other programmable logic devices, discrete gates or transistor logics, discrete hardware components or any combination thereof, which are designed to execute functions described herein. The general-purpose processor may be a microprocessor, but instead, the processor may be any conventional processor, controller, microcontroller and/or state machine. The processor may also be implemented as a combination of computation devices, e.g. a DSP and a microprocessor, a plurality of microprocessors, one or more microprocessors in conjunction with a DSP core and/or any other combinations of such configurations.

Functions described herein may be implemented in hardware, software executed by a processor, firmware or any combination thereof. If implemented in software executed by the processor, the functions may be stored on a computer-readable medium or transmitted as one or more instructions or codes on a computer-readable medium. Other examples and implementations are within the scope and spirit of the present disclosure and the appended claims. For example, in view of the essence of software, the above described functions may be executed by using software executed by the processor, hardware, firmware, hard-wire or any combination of these. Feature to achieve the functions may also be located in various positions physically, including being distributed such that parts of the functions are implemented in different physical positions.

In addition, disclosure of a component which is contained in other components or separated from other components should be deemed to be exemplary, because potentially it is possible to implement various other architectures to achieve the same function, including incorporating all, a major part of, and/or some elements as one or more single structures or a part of a separate structure.

The computer-readable medium includes both a computer storage medium and a communication medium, the communication medium includes any medium which facilitates transmission of a computer program from one place to another place. The storage medium may be any usable medium which can be accessed by a general-purpose computer or a special-purpose computer. By way of example, and not limitation, the computer-readable media may comprise RAM, ROM, EEPROM, flash memory, CD-ROM, DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is appropriately referred to as a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. The Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above contents are also included within the scope of computer-readable media.

The foregoing description of the present disclosure is provided to enable those skilled in the art to make or use the present disclosure. Various modifications to the present disclosure are obvious to those skilled in the art, general principles defined herein may be applied to other modifications without departing from the scope the present disclosure. Therefore, the present disclosure is not limited to examples and designs described herein, but corresponds to the broadest scope consistent with the disclosed principles and new features.

The invention claimed is:

1. An electronic device for a wireless communication system, comprising:
   processing circuitry configured to
   perform control to transmit receive signals to/from a target communication apparatus via an offset array antenna associated with the electronic device, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction; and
   acquire a state of a channel in the first direction between the offset array antenna and the target communication apparatus, wherein the state of the channel in the first direction is determined using the signals which comprise the phase difference in the first direction.

2. The electronic device of claim 1, wherein
   the state of the channel in the first direction is acquired using a reference set of antenna elements and at least one offset antenna element of the multiple sets of antenna elements, and the at least one offset antenna element has a spatial offset in the first direction with respect to antenna elements of the reference set of antenna elements.

3. The electronic device of claim 2, wherein one of the following:
   the state of the channel in the first direction is acquired by performing phase compensation in the second direction on the at least one offset antenna element;
   the processing circuitry is further configured to transmit multiple beams with different angles with respect to the first direction using the reference set of antenna elements and the at least one offset antenna element, wherein the state of the channel in the first direction is determined based on feedback information from the target communication apparatus, the feedback information comprising indication of reception states of the target communication apparatus for the multiple beams; or
   the processing circuitry is further configured to perform control to:
   transmit a first reference signal via the offset array antenna;
   receive, from the target communication apparatus, first channel information acquired based on the first reference signal;

transmit a beam-formed second reference signal based on the first channel information using the reference set of antenna elements and the at least one offset antenna element and receive, from the target communication apparatus, second Channel information acquired based on the second reference signal.

4. The electronic device of claim 2, wherein the processing circuitry is further configured to perform control to:

acquire a joint channel coefficient vector for the reference set of antenna elements and the at least one offset antenna element, the joint channel coefficient vector comprising channel coefficients for the reference set of antenna elements and a channel coefficient for the at least one offset antenna element subject to a compensation, wherein the stale of the channel in the first direction is acquired based on the joint channel coefficient vector.

5. The electronic device of claim 4, wherein the compensation is performed based on initial channel coefficients for the offset array antenna, and the initial channel coefficients are acquired by a channel state estimation method for a non-offset array antenna.

6. The electronic device of claim 1, wherein the processing circuitry is further configured to determine an offset codebook for performing beam-forming on the offset array antenna based on the phase difference in the first direction.

7. The electronic device of claim 6, wherein the offset codebook is acquired by adding a phase offset to a non-offset codebook.

8. The electronic device of claim 1, wherein one of the following:

the processing circuitry is further configured to perform control to send offset information on the offset array antenna to the target communication apparatus;

the processing circuitry is further configured to adjust the spatial offset in the first direction among the multiple sets of antenna elements;

the electronic device is implemented as a base station, and comprises the offset array antenna; or the first direction is a vertical direction.

9. An electronic device for a wireless communication system, comprising:

processing circuitry configured to receive signals from an offset array antenna associated with a target communication apparatus, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction;

acquire a state of a channel in the first direction between the offset array antenna and an antenna associated with the electronic device, using the signals which comprise the phase difference in the first direction; and send information comprising indication of the state of the channel in the first direction to the target communication apparatus.

10. The electronic device of claim 9, wherein the first direction is a vertical direction.

11. The electronic device of claim 9, wherein
the state of the channel in the first direction is acquired using a reference set of antenna elements and at least one offset antenna element of the multiple sets of antenna elements, the at least one offset antenna element has a spatial offset in the first direction with respect to antenna elements of the reference set of antenna elements.

12. The electronic device of claim 11, wherein one of the following:

the processing circuitry is further configured to:

perform control to receive multiple beams with different angles with respect to the first direction transmitted using the reference set of antenna elements and the at least one offset antenna element, wherein the information sent to the target communication apparatus comprises indication of reception states of the antenna associated with the electronic device for the multiple beams; or the processing circuitry is further configured to perform control to:

receive a first reference signal from the offset array antenna;

send to the target communication apparatus first channel information acquired based on the first reference signal;

receive a beam-formed second reference signal transmitted using the reference set of antenna elements and the at least one offset antenna element based on the first channel information; and send to the target communication apparatus second channel information acquired based on the second reference signal.

13. An electronic device comprising:

processing circuitry configured to receive signals from an offset array antenna associated with a target communication apparatus, wherein the offset array antenna comprises multiple sets of antenna elements, each of the multiple sets of antenna elements has multiple antenna elements arranged in a first direction, a spatial offset in the first direction and a phase difference in the first direction exist among the multiple sets of antenna elements, and the multiple sets of antenna elements are arranged in a second direction perpendicular to the first direction;

acquire offset information on the offset array antenna;

determine an offset codebook for the offset array antenna based on the offset information and the signals.

14. The electronic device of claim 13, wherein the first direction is a vertical direction.

15. The electronic device of claim 13, wherein determining the offset codebook for the offset array antenna based on the offset information and the signals comprises:

estimate a state of a channel between the electronic device and the target communication apparatus based on the signals; and compare estimated result of the state of the channel with codewords of the offset coded book generated based on the offset information, to determine a matched codeword, wherein the processing circuitry is further configured to send information comprising indication of the matched codeword to the target communication apparatus.

16. The electronic device of claim 15, wherein one of the following:

the offset codebook is an offset Kronecker product DFT codebook; or the offset codebook is a codebook in the second direction.

* * * * *